US012366050B2

(12) United States Patent
Ishida et al.

(10) Patent No.: US 12,366,050 B2
(45) Date of Patent: Jul. 22, 2025

(54) OPERATION UNIT FOR CONSTRUCTION MACHINE, AND CONSTRUCTION MACHINE

(71) Applicant: SUMITOMO HEAVY INDUSTRIES, LTD., Tokyo (JP)

(72) Inventors: Hiroaki Ishida, Kanagawa (JP); Takashi Hoshino, Kanagawa (JP); Dotaro Usui, Kanagawa (JP); Shinichiro Tsukahara, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/519,638

(22) Filed: Nov. 27, 2023

(65) Prior Publication Data

US 2024/0175240 A1 May 30, 2024

(30) Foreign Application Priority Data

Nov. 28, 2022 (JP) ................................. 2022-189384

(51) Int. Cl.

| | |
|---|---|
| ***E02F 9/20*** | (2006.01) |
| ***G05G 5/03*** | (2008.04) |
| ***G05G 9/047*** | (2006.01) |

(52) U.S. Cl.

CPC .......... *E02F 9/2004* (2013.01); *E02F 9/2025* (2013.01); *G05G 5/03* (2013.01); *G05G 9/047* (2013.01); *G05G 2009/04766* (2013.01)

(58) Field of Classification Search

None

See application file for complete search history.

(56) References Cited

U.S. PATENT DOCUMENTS

| | | | | |
|---|---|---|---|---|
| 11,231,737 | B2 * | 1/2022 | Asano | G05G 9/047 |
| 2003/0055538 | A1 | 3/2003 | Yanaka | |
| 2021/0047808 | A1 * | 2/2021 | Yamada | E02F 9/268 |
| 2021/0340728 | A1 * | 11/2021 | Graham | G05G 5/02 |
| 2022/0300025 | A1 | 9/2022 | Katoh et al. | |

FOREIGN PATENT DOCUMENTS

| | | |
|---|---|---|
| JP | 2019-127560 | 8/2019 |
| KR | 20100085621 | 7/2010 |

* cited by examiner

*Primary Examiner* — Vicky A Johnson
(74) *Attorney, Agent, or Firm* — IPUSA, PLLC

(57) ABSTRACT

An operation unit for a construction machine includes an operation part configured to be operated to input a direction for operating the construction machine. When a first direction is input through the operation part, the operation part is configured to present a second direction corresponding to the first direction to an operator operating the operation part.

12 Claims, 13 Drawing Sheets

OPERATION UNIT FOR CONSTRUCTION MACHINE, AND CONSTRUCTION MACHINE

CROSS-REFERENCE TO RELATED APPLICATIONS

This application is based upon and claims priority to Japanese Patent Application No. 2022-189384, filed on Nov. 28, 2022, the entire contents of which are incorporated herein by reference.

BACKGROUND

Technical Field

The present disclosure relates to an operation unit for a construction machine and a construction machine.

Description of Related Art

In a conventional construction machine, an operation device for an operator to perform work is provided. As the operation device, for example, an operation lever having multiple degrees of freedom is provided. The operation lever controls a hydraulic drive system in response to an operation by an operator, for example.

In recent years, various operation devices for construction machines have been proposed. As the operation device, for example, a technique has been proposed in which, when a hydraulic drive system is controlled based on an operation signal output from the operation device, a vibration device is vibrated in accordance with a hydraulic load being generated in the hydraulic drive system in order to notify an operator of a negative pressure load being generated in the hydraulic drive system.

SUMMARY

An operation unit for a construction machine according to an aspect of the present disclosure includes an operation part configured to be operated to input a direction for operating the construction machine. When a first direction is input through the operation part, the operation part is configured to present a second direction corresponding to the first direction to an operator operating the operation part.

DETAILED DESCRIPTION

Figure 1:
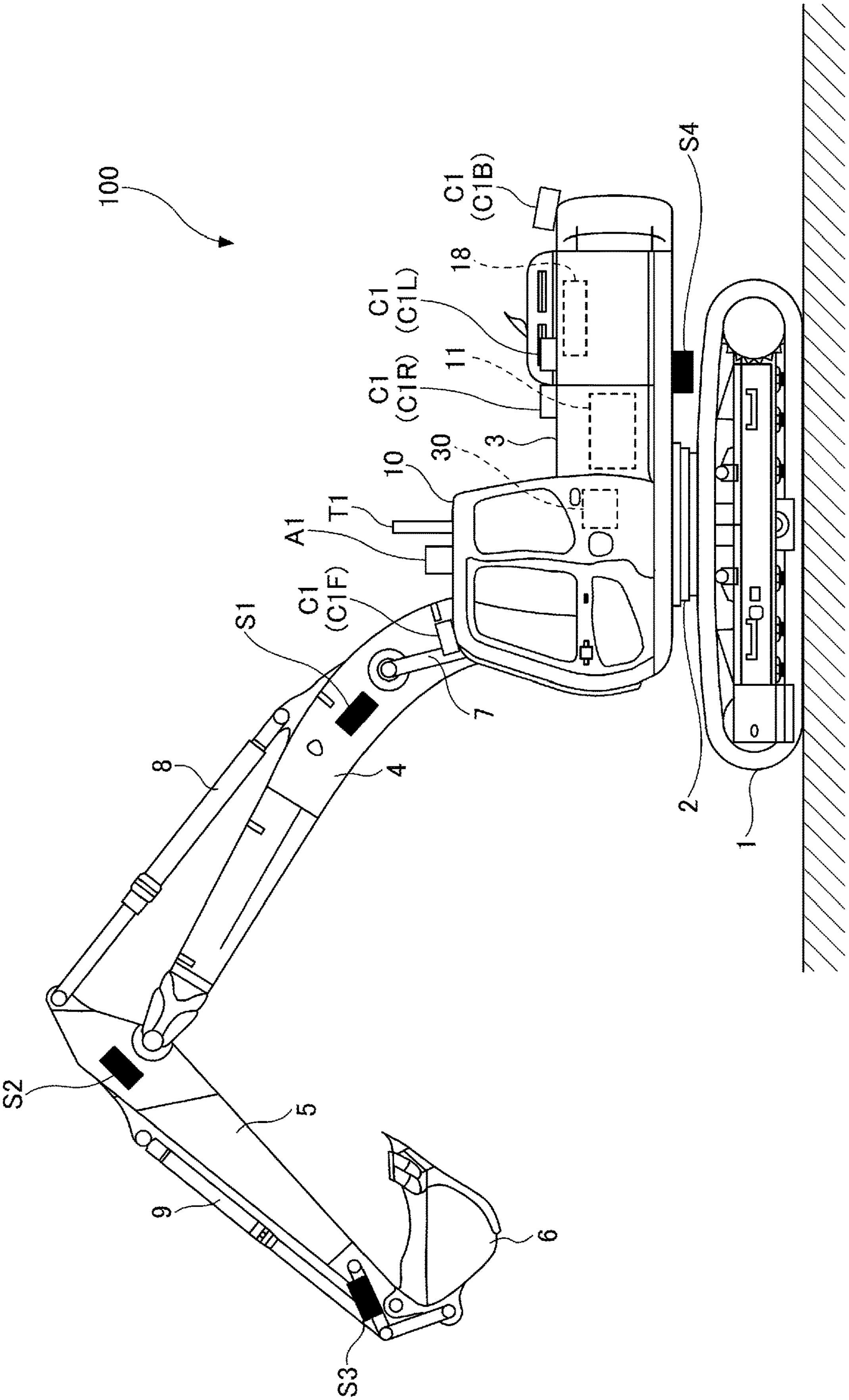
FIG. 1 is a side diagram illustrating a shovel (excavator) according to an embodiment.

According to the above-described related-art technique, when the vibration of the vibration device is used to notify the operator of the current situation, the operator can recognize that the situation where the vibration is needed to be addressed has occurred, but may not recognize what operation should be performed. Therefore, when the operation device notifies the operator of the situation, it is preferable to present a direction corresponding to the situation.

In view of the above, an operation unit for a construction machine notifies an operator of a situation to address an operation performed on the construction machine, by presenting a direction.

An aspect of the present disclosure provides a technique to improve safety by presenting a second direction corresponding to a first direction in which input has been made and notifying an operator of a situation to address an operation performed on a construction machine.

Hereinafter, embodiments of the present disclosure will be described with reference to the drawings. In the drawings, the same or corresponding components are denoted by the same reference numerals, and the description thereof may be omitted.

FIG. 1 illustrates a shovel 100 as a construction machine according to an embodiment. An upper swing body 3 is swingably mounted on a lower traveling body 1 of the shovel 100 via a swing mechanism 2. A boom 4 is attached to the upper swing body 3. An arm 5 is attached to the distal end of the boom 4, and a bucket 6 as an end attachment is attached to the distal end of the arm 5.

The boom 4, the arm 5, and the bucket 6 constitute an excavation attachment which is an example of an attachment. The boom 4 is driven by a boom cylinder 7, the arm 5 is driven by an arm cylinder 8, and the bucket 6 is driven by a bucket cylinder 9.

A boom angle sensor S1 is attached to the boom 4, an arm angle sensor S2 is attached to the arm 5, and a bucket angle sensor S3 is attached to a bucket link. A swing angular speed sensor S4 is attached to the upper swing body 3.

The boom angle sensor S1 is one of the attitude detection sensors, and is configured to detect a rotation angle of the boom 4. In this embodiment, the boom angle sensor S1 is a stroke sensor that detects a stroke amount of the boom cylinder 7, and derives the rotation angle of the boom 4 around a boom foot pin that couples the upper swing body 3 and the boom 4, based on the stroke amount of the boom cylinder 7.

The arm angle sensor S2 is one of the attitude detection sensors, and is configured to detect a rotation angle of the arm 5. In this embodiment, the arm angle sensor S2 is a stroke sensor that detects a stroke amount of the arm cylinder 8, and derives the rotation angle of the arm 5 around a coupling pin that couples the boom 4 and the arm 5, based on the stroke amount of the arm cylinder 8.

The bucket angle sensor S3 is one of the attitude detection sensors, and is configured to detect a rotation angle of the bucket 6. In this embodiment, the bucket angle sensor S3 is a stroke sensor that detects a stroke amount of the bucket cylinder 9, and derives the rotation angle of the bucket 6 around a coupling pin that couples the arm 5 and the bucket 6, based on the stroke amount of the bucket cylinder 9.

Note that each of the boom angle sensor S1, the arm angle sensor S2, and the bucket angle sensor S3 may be a rotary encoder, an accelerometer, a potentiometer (variable resister), a tilt sensor, an inertia measuring device, or the like. The inertia measuring device may be configured by a combination of an accelerometer and a gyro sensor, for example.

The swing angular speed sensor S4 is configured to detect a swing angular speed of the upper swing body 3. In this embodiment, the swing angular speed sensor S4 is a gyro sensor. The swing angular speed sensor S4 may be configured to calculate the swing angle based on the swing angular speed. The swing angular speed sensor S4 may be configured by another sensor such as a rotary encoder.

The upper swing body 3 is provided with a cabin 10 as an operation room for a driver, an engine 11, a positioning device 18, a sound collecting device A1, an imaging device C1, a communication device T1, and the like. A controller 30 is mounted in the cabin 10. A driver's seat, an operation device, and the like are installed in the cabin 10.

The engine 11 is a drive source of the shovel 100. In this embodiment, the engine 11 is a diesel engine. An output shaft of the engine 11 is connected to respective input shafts of a main pump 14 and a pilot pump 15.

A positioning device 18 is configured to measure the position of the shovel 100. In this embodiment, the positioning device 18 is a GNSS sensor and is configured to be able to measure the position and orientation of the upper swing body 3.

The sound collecting device A1 is configured to collect sound generated around the shovel 100. In this embodiment, the sound collecting device A1 is a microphone attached to the upper swing body 3.

The imaging device C1 is configured to capture an image of the surroundings of the shovel 100. In this embodiment, the imaging device C1 includes a rear camera C1B attached to the rear end of the upper surface of the upper swing body 3, a front camera C1F attached to the front end of the upper surface of the cabin 10, a left camera C1L attached to the left end of the upper surface of the upper swing body 3, and a right camera C1R attached to the right end of the upper surface of the upper swing body 3. The imaging device C1 may be a spherical camera installed at a predetermined position in the cabin 10. The predetermined position is, for example, a position corresponding to the position of the eyes of the operator seated on the driver's seat in the cabin 10.

The communication device T1 is configured to control communication with a device outside the shovel 100. In this embodiment, the communication device T1 is configured to control wireless communication between the communication device T1 and a device outside the shovel 100 via a wireless communication network. The communication device T1 includes, for example, a mobile communication module conforming to a mobile communication standard such as Long Term Evolution (LTE), 4th Generation (4G), or 5th Generation (5G), a satellite communications module for connecting to a satellite communications network, or the like.

The controller 30 is a calculation device that performs various calculations. The controller 30 is provided in the cabin 10, for example, and performs drive control of the shovel 100. The function of the controller 30 may be implemented by any hardware, software, or a combination thereof. For example, the controller 30 is mainly constituted by a microcomputer including a central processing unit (CPU), a memory device such as a random-access memory (RAM), a nonvolatile auxiliary storage device such as a read only memory (ROM), various input/output interface devices, and the like. The controller 30 performs various functions by executing various programs installed in a nonvolatile auxiliary storage device by the CPU, for example.

Figure 2:
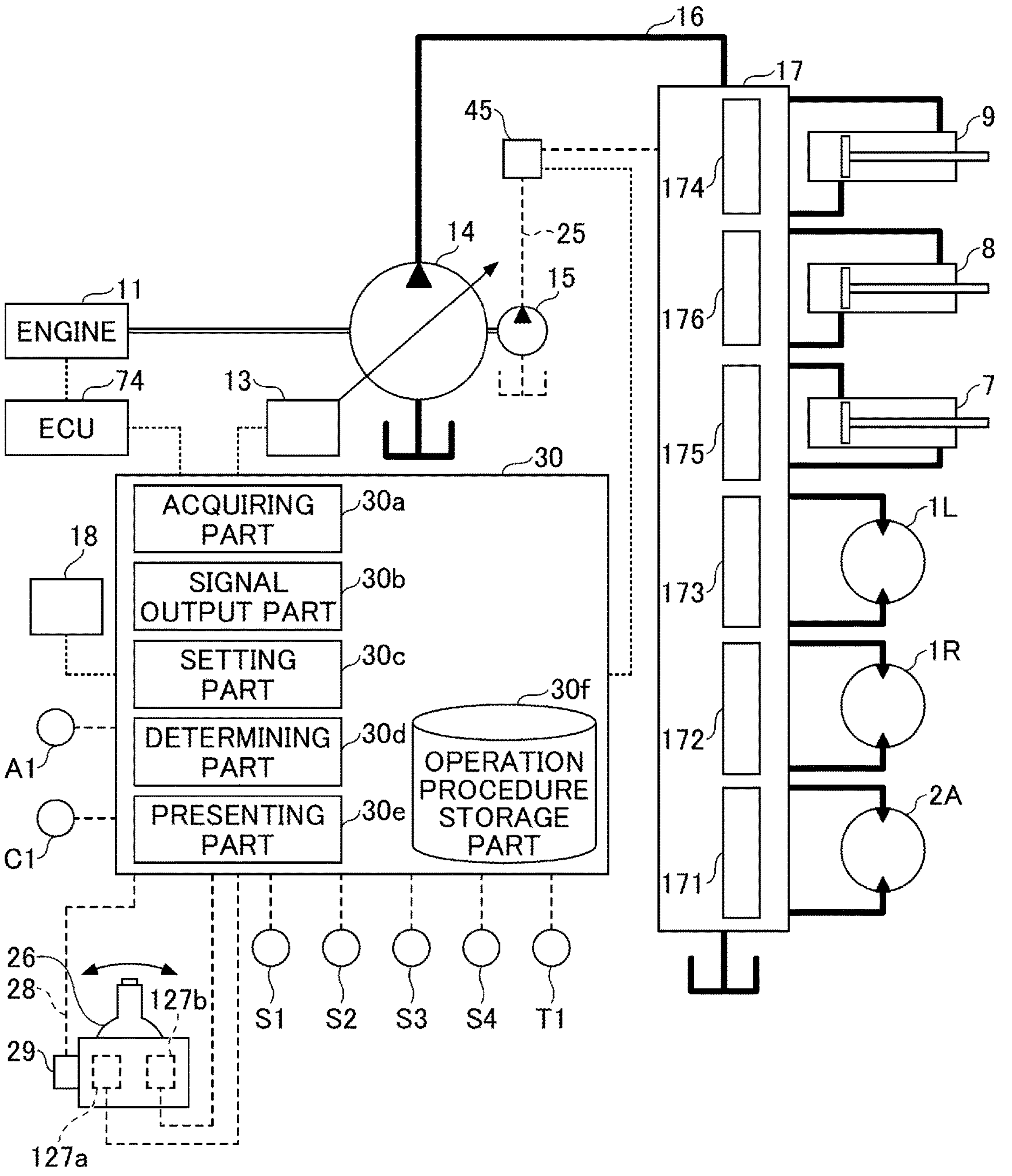
FIG. 2 is a block diagram illustrating a drive system configuration example of the shovel according to the embodiment.

FIG. 2 is a block diagram illustrating a configuration example of a drive system of the shovel 100 of FIG. 1. In FIG. 2, a mechanical power transmission line is indicated by a double line, a hydraulic oil line is indicated by a thick solid line, a pilot line is indicated by a broken line, and an electric control line is indicated by a dotted line.

The drive system of the shovel 100 includes the engine 11, a regulator 13, the main pump 14, the pilot pump 15, a control valve part 17, the controller 30, an electromagnetic valve part 45, and the like. The engine 11 is controlled by an engine control part 74.

The main pump 14 supplies hydraulic oil to the control valve part 17 through a hydraulic oil line 16. In this embodiment, the main pump 14 is a swash plate type hydraulic pump with variable displacement.

The regulator 13 is configured to control a discharge amount of the main pump 14. In this embodiment, the regulator 13 is configured to adjust a tilt angle of the swash plate of the main pump 14 in accordance with a discharge pressure of the main pump 14, a control signal from the controller 30, or the like. The main pump 14 is controlled by the regulator 13 in terms of the discharge amount (displacement volume) per rotation.

The control valve part 17 is configured to be able to selectively supply the hydraulic oil received from the main pump 14 to one or more of hydraulic actuators. In this embodiment, the control valve part 17 includes control valves corresponding to the hydraulic actuators. The hydraulic actuators include, for example, a boom cylinder 7, an arm cylinder 8, a bucket cylinder 9, a left traveling hydraulic motor 1L, a right traveling hydraulic motor 1R, and a swing hydraulic motor 2A.

Control valves 171 to 176 in the control valve part 17 are controlled to achieve operations of various hydraulic actuators in accordance with operation contents on an operation device 26.

In this embodiment, the electromagnetic valve part 45 that operates in response to an electric signal from the controller 30 is disposed between the pilot pump 15 and the pilot ports of the control valves 171 to 176.

<Operation System>

An operation system of the shovel 100 according to this embodiment includes the pilot pump 15, the operation device 26, and the electromagnetic valve part 45.

The pilot pump 15 is configured to supply the hydraulic oil to various hydraulic control devices (for example, the electromagnetic valve part 45) via a pilot line 25. Thus, the electromagnetic valve part 45 can supply the pilot pressure corresponding to an operation content (for example, an operation amount or an operation direction) on the operation device 26 to the control valve part 17 under the control of the controller 30.

Accordingly, the controller 30 and the electromagnetic valve part 45 can achieve the operation of the driven element (hydraulic actuator) according to the operation content of the operator on the operation device 26. Furthermore, the electromagnetic valve part 45 can supply the pilot pressure corresponding to a remote content designated by an operation signal received by the communication device T1 as a remote operation to the control valve part 17 under the control of the controller 30. The pilot pump 15 is, for example, a hydraulic pump with fixed displacement, and is driven by a pump electric motor 12 as described above.

The electromagnetic valve part 45 includes electromagnetic valves arranged in the respective pilot lines 25 each connecting the pilot pump 15 and the corresponding pilot port of the control valves in the control valve part 17.

When a manual operation using the operation device 26 is performed, the controller 30 controls each of the electromagnetic valves in the electromagnetic valve part 45 to increase or decrease the pilot pressure by an electric signal corresponding to the operation amount (for example, a lever operation amount), thereby operating each of the control valves 171 to 176 in accordance with the operation content on the operation device 26.

That is, in this embodiment, the controller 30 individually controls the opening areas of the electromagnetic valves of the electromagnetic valve part 45 by the electric signal corresponding to the operation amount of the operation device 26, and thereby, the pilot pressure acting on the pilot port of each of the control valves 171 to 176 can be controlled. Therefore, the controller 30 can control the flow rate of the hydraulic oil flowing into each hydraulic actuator and the flow rate of the hydraulic oil flowing out of each hydraulic actuator, thereby controlling the movement of each hydraulic actuator.

The operation device 26 (an example of an operation part) is a device to be operated to input a direction for operating the shovel 100 (an example of a construction machine). For example, the operation device 26 includes at least a movable part 126*a*, a support part 123, a first actuator 127*b* (an example of a driving part), and a second actuator 127*a* (another example of a driving part) described below. For example, the operation device 26 is provided within reach of an operator in a cockpit of the cabin 10, and is used by the operator to operate the respective driven elements (that is, left and right crawlers of the lower traveling body 1, the upper swing body 3, the boom 4, the arm 5, the bucket 6, and the like). In other words, the operation device 26 is used by the operator to operate hydraulic actuators (for example, the traveling hydraulic motors 1R and 1L, a swing hydraulic motor 2M, the boom cylinder 7, the arm cylinder 8, the bucket cylinder 9, and the like) and electric actuators that drive the respective driven elements.

An operation content detection device 29 is a device that detects the operation content of the operator using the operation device 26. In this embodiment, the operation content detection device 29 detects an operation direction and an operation amount of a lever or a pedal as the operation device 26 corresponding to each of the hydraulic actuators, and outputs an electric signal (hereinafter, referred to as an operation signal) indicating the detected value to the controller 30. In this embodiment, an example in which gear sensors 29*a* and 29*b* described later are provided as the operation content detection device 29 will be described, but the method of detecting the operation amount is not limited thereto. An output of another sensor such as a potentiometer or a pressure sensor may be used to obtain the operation amount.

The operation signal output from the operation content detection device 29 is received by the controller 30 via a signal line 28. Thus, the controller 30 can control the electromagnetic valve part 45 and control the operations of the driven elements (actuators) of the shovel 100 in accordance with the operation contents of the operation device 26, the operation contents by the operation signal received by the communication device T1, or the like. Note that, the operation device 26 may be a hydraulic pilot type that outputs a pilot pressure corresponding to an operation content. In such a case, the pilot pressure corresponding to the operation content is supplied to the control valve part 17.

The operation device 26 stores the first and second actuators 127*a* and 127*b*. The first and second actuators 127*a* and 127*b* apply a load to the lever of the operation device 26 in accordance with a control signal from the controller 30. Next, a specific configuration of the operation device 26 will be described.

Figure 3:
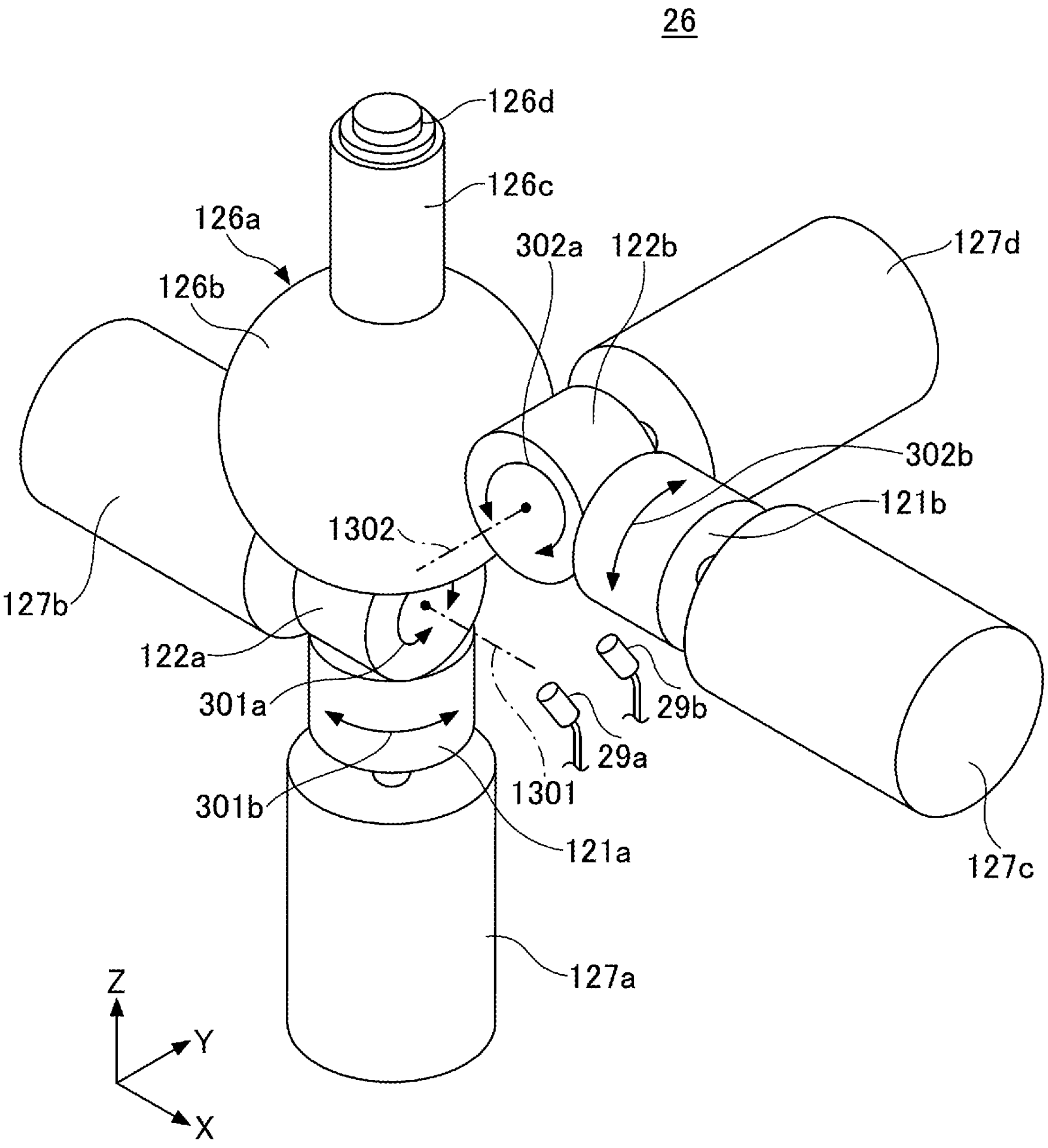
FIG. 3 is a diagram illustrating an external appearance example of a lever provided in an operation device according to the embodiment.

FIG. 3 is a diagram illustrating an external appearance example of the operation device 26 according to this embodiment. The operation device 26 illustrated in FIG. 3 includes the movable part 126*a*, which rotates in response to an operation by the operator. The movable part 126*a* includes a convex spherical member 126*b*, a grip (an example of a steering member) 126*c* to be touched by a hand (an example of a portion) of the operator, and a pressing member 126*d* for the operator to press.

In this embodiment, an example in which the pressing member 126*d* is provided at an end portion of the grip 126*c* in the upward direction (positive Z-axis direction) will be described. However, the pressing member 126*d* may be provided at any position as long as the operator can press the pressing member.

The grip 126*c* of the operation device 26 according to this embodiment can be tilted in two axial directions including the X-axis direction and the Y-axis direction.

In the operation device 26, a configuration of components provided on the Z-axis negative direction side of the convex spherical member 126*b* will be described. The components provided on the Z-axis negative direction side of the operation device 26 include the first actuator 127*b*, an inner pinion gear 122*a*, the second actuator 127*a*, and an outer pinion gear 121*a*.

First, the first actuator 127*b* and the inner pinion gear 122*a* will be described.

The first actuator 127*b* can rotate the inner pinion gear 122*a*. The inner pinion gear 122*a* is in meshing contact with the convex spherical member 126*b*. A load can be applied to the convex spherical member 126*b* in a rotational direction 301*a* of the inner pinion gear 122*a* by the first actuator 127*b* rotating the inner pinion gear 122*a*.

Next, the second actuator 127*a* and the outer pinion gear 121*a* will be described. The outer pinion gear 121*a* is configured to be able to rotate the inner pinion gear 122*a* in a rotational direction 301*b*. The configuration in which the outer pinion gear 121*a* can rotate the inner pinion gear 122*a* may be any configuration from among the well-known applicable configurations.

The second actuator 127*a* can rotate the outer pinion gear 121*a*. Therefore, the inner pinion gear 122*a* can be rotated in accordance with the rotational direction 301*b* of the outer pinion gear 121*a*, in other words, about the Z-axis direction, by the second actuator 127*a* rotating the outer pinion gear 121*a*.

In the example illustrated in FIG. 3, the direction of a rotation axis 1301 of the inner pinion gear 122*a* is illustrated as the X-axis direction, but the second actuator 127*a* can switch the direction of the rotation axis 1301 of the inner pinion gear 122*a* to the Y-axis direction, for example, by rotating the inner pinion gear 122*a* together with the outer pinion gear 121*a*. By rotating the inner pinion gear 122*a* in such a way, the direction of the rotation axis 1301 for applying a load to the convex spherical member 126*b* can be switched to a direction including at least one of the X-axis direction and the Y-axis direction.

Furthermore, depending on the meshing between the inner pinion gear 122*a* and the convex spherical member 126*b*, a load can be applied to the convex spherical member 126*b* in the rotational direction 301*b* around the Z-axis direction by the second actuator 127*a* rotating the outer pinion gear 121*a*, and thus, together with the inner pinion gear 122*a*.

As described above, by controlling the inner pinion gear 122*a* and the outer pinion gear 121*a* using the first actuator 127*b* and the second actuator 127*a*, a load can be applied to the convex spherical member 126*b* with axial directions (for example, the X-axis direction, the Y-axis direction, and the Z-axis direction) as the rotation axes. Thus, for the operator gripping the grip 126*c*, the load can be presented in multiple operation directions.

In the operation device 26, a configuration of components provided on the X-axis negative direction side of the convex spherical member 126*b* will be described. The components provided on the X-axis negative direction side of the operation device 26 include a third actuator 127*d*, an inner pinion gear 122*b*, a fourth actuator 127*c*, and an outer pinion gear 121*b*.

First, the third actuator 127*d* and the inner pinion gear 122*b* will be described.

The third actuator 127*d* can rotate the inner pinion gear 122*b*. The inner pinion gear 122*b* is in meshing contact with the convex spherical member 126*b*. A load can be applied to the convex spherical member 126*b* in a rotational direction 302*a* of the inner pinion gear 122*b* by the third actuator 127*d* rotating the inner pinion gear 122*b*.

Next, the fourth actuator 127*c* and the outer pinion gear 121*b* will be described. The outer pinion gear 121*b* is configured to be able to rotate the inner pinion gear 122*b* in a rotational direction 302*b*. The configuration in which the outer pinion gear 121*b* can rotate the inner pinion gear 122*b* may be any configuration from among the well-known configurations.

The fourth actuator 127*c* can rotate the outer pinion gear 121*b*. Therefore, the inner pinion gear 122*b* can be rotated in the rotational direction 302*b* of the outer pinion gear 121*b*, in other words, about the X-axis direction, by the fourth actuator 127*c* rotating the outer pinion gear 121*b*.

In the example illustrated in FIG. 3, a direction of a rotation axis 1302 of the inner pinion gear 122*b* is illustrated as the Y-axis direction, but the fourth actuator 127*c* can switch the direction of the rotation axis 1302 of the inner pinion gear 122*b* to the Z-axis direction, for example, by rotating the inner pinion gear 122*b* together with the outer pinion gear 121*b*. By rotating the inner pinion gear 122*b* in such a way, the direction of the rotation axis 1302 for applying a load to the convex spherical member 126*b* can be switched to a direction including at least one of the Y-axis direction and the Z-axis direction.

Furthermore, depending on the meshing between the inner pinion gear 122*b* and the convex spherical member 126*b*, a load can be applied to the convex spherical member 126*b* in the rotational direction 302*b* around the X-axis direction by the fourth actuator 127*c* rotating the outer pinion gear 121*b*, together with the inner pinion gear 122*b*.

As described above, by controlling the inner pinion gear 122*b* and the outer pinion gear 121*b* using the third actuator 127*d* and the fourth actuator 127*c*, a load can be applied to the convex spherical member 126*b* with axial directions (for example, the X-axis direction, the Y-axis direction, and the Z-axis direction) as the rotation axes. Thus, for the operator gripping the grip 126*c*, the load can be presented in multiple operation directions.

In such a way, the actuators 127*a* to 127*d* rotate the convex spherical member 126*b* of the movable part 126*a* about each of the three orthogonal axes (the X-axis direction, the Y-axis direction, and the Z-axis direction). The grip 126*c* is thereby coupled to the convex spherical member 126*b*. Therefore, for the operator gripping the grip 126*c*, a load can be presented in a rotational direction around each of three axes (X-axis direction, Y-axis direction, and Z-axis direction) orthogonal to each other.

For example, when the grip 126*c* is tilted in at least one of the X-axis direction and the Y-axis direction by the operator's operation, the convex spherical member 126*b* coupled to the grip 126*c* also rotates in the direction in which the grip is tilted.

The gear sensor 29*a* and the gear sensor 29*b* detect a rotation amount of the convex spherical member 126*b*. The gear sensor 29*a* is provided at a position where the gear sensor 29*a* can detect the movement of teeth of the convex spherical member 126*b* in the Y-axis direction when the grip 126*c* is tilted in the Y-axis direction. The gear sensor 29*b* is provided at a position where the gear sensor 29*b* can detect the movement of the teeth of the convex spherical member 126*b* in the X-axis direction when the grip 126*c* is tilted in the X-axis direction. Therefore, the gear sensor 29*a* detects a rotation amount in the Y-axis direction based on the teeth provided on the surface of the convex spherical member 126*b*, and the gear sensor 29*b* detects a rotation amount in the X-axis direction based on the teeth provided on the surface of the convex spherical member 126*b*. The gear sensor 29*a* outputs the detected rotation amount of the convex spherical member 126*b* to the controller 30 as an electric signal indicating an operation amount performed in the Y-axis direction. The gear sensor 29*b* also outputs the detected rotation amount of the convex spherical member 126*b* to the controller 30 as an electric signal indicating an operation amount performed in the X-axis direction. Note that, in this embodiment, an example of using the gear sensors 29*a* and 29*b* as a method of detecting the operation amount from the operator will be described. However, this embodiment exemplifies one aspect of the method of detecting the operation amount, and the operation amount may be detected in any way from among the well-known methods.

Figure 4:
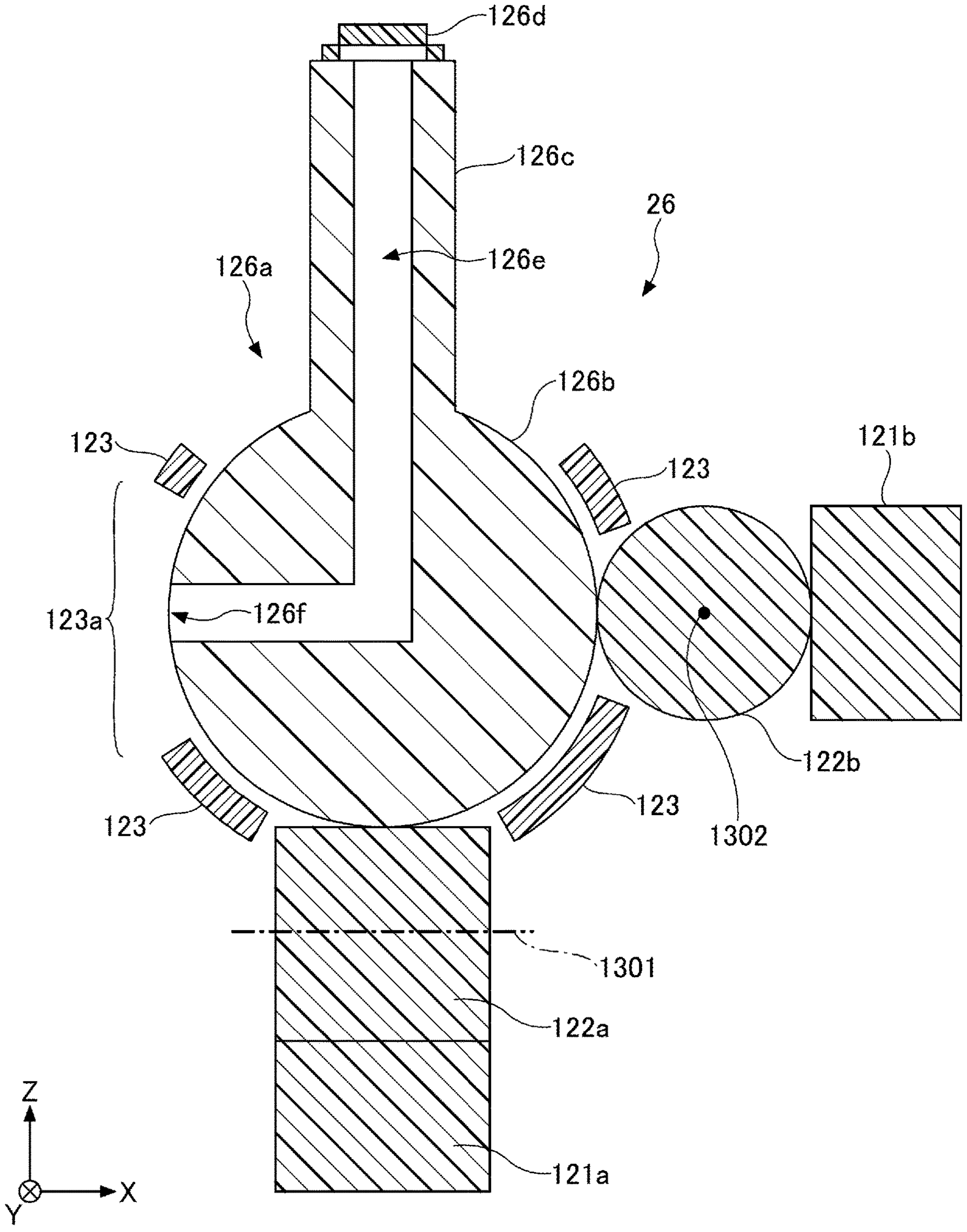
FIG. 4 is a diagram illustrating a cross section of the lever provided in the operation device according to the embodiment.

FIG. 4 is a diagram illustrating a cross section of the operation device 26 according to this embodiment. As illustrated in FIG. 4, the support part 123 has a recessed inner wall surface corresponding to the shape of the convex spherical member 126*b* and is provided so as to support the convex spherical member 126*b* of the movable part 126*a* of the operation device 26 from the outer surface.

The convex spherical member 126*b* is accommodated in the support part 123 so as to be slidable (rotatable) in any direction in the X and Y planes. The convex spherical member 126*b* may be slidably accommodated in the support part 123 in any way from among the well-known applicable methods.

The operation device 26 is provided with a cylindrical hollow portion 126*e* for passing a signal line (not illustrated) connected to the pressing member 126*d*.

The support part 123 has an open shape so as not to cover an area where the inner pinion gears 122*a* and 122*b* are in contact with the convex spherical member 126*b* and an area where the grip 126*c* is movable in accordance with an operation. Similarly, the support part 123 has a shape having an opening 123*a* so that an area in the vicinity of an opening 126*f* is not covered.

The signal line passing through the hollow portion 126*e* is connected to the controller 30 from the opening 126*f* at one end of the hollow portion 126*e* through the opening 123*a* of the support part 123. Thus, an electric signal indicating whether or not the pressing member 126*d* is pressed is input to the controller 30. In this embodiment, since the operation device 26 has the above-described configuration, a load can be easily applied with each of the X-axis direction, the Y-axis direction, and the Z-axis direction as a rotation axis for the operator, and the controller 30 can be notified of the operation performed on the pressing member 126*d* provided on the grip 126*c*. This makes it possible to improve operability.

Next, an example of the relationship between the convex spherical member 126*b*, the inner pinion gear 122*a*, and the inner pinion gear 122*b* according to this embodiment will be described.

For example, the inner pinion gear 122*a* and the inner pinion gear 122*b* may be formed as monopole gears and may include multiple types of teeth. For example, teeth that are closed in a circle around a predetermined point may be formed on the side surfaces of the inner pinion gear 122*a* and the inner pinion gear 122*b*, curved teeth may be formed around the teeth that are closed in a circle, and teeth that are not curved (for example, spur teeth) may be formed in other regions.

The convex spherical member 126*b* is formed, for example, as a spherical gear. Specifically, the convex spherical member 126*b* may be provided with teeth so as to form a circle shape with predetermined positions on the surface of the spherical member as the polar points which act as the centers of the circle (for example, in a case where the convex spherical member 126*b* is regarded as the earth, the teeth may be arranged so as to form a circle shape corresponding to a circle of latitude with the polar points corresponding to the north pole and the south pole as the centers of the circle shape).

In this embodiment, the polar points of the convex spherical member 126*b* and predetermined points of the inner pinion gear 122*a* and the inner pinion gear 122*b* may be provided to have a correspondence relationship. For example, the teeth near the polar point of the convex spherical member 126*b* may be formed to mesh with the teeth centered at the respective predetermined points of the inner pinion gear 122*a* and the inner pinion gear 122*b*. The teeth whose shape changes as the distance from the vicinity of the polar point of the convex spherical member 126*b* increases and the teeth formed centered at the respective predetermined points of the inner pinion gear 122*a* and the inner pinion gear 122*b* may be formed to mesh with each other. For example, the convex spherical member and the inner pinion gears may be formed to have the ratio of the circumferential length of the convex spherical member 126*b* to the circumferential length of each of the inner pinion gear 122*a* and the inner pinion gear 122*b* be 2:1.

The surface of the convex spherical member 126*b* according to this embodiment may be formed with a combination of teeth centered at a first polar point for meshing with the inner pinion gear 122*a* and teeth centered at a second polar point for meshing with the inner pinion gear 122*b*. This allows the convex spherical member 126*b* to rotate in correspondence with each of the inner pinion gear 122*a* and the outer pinion gear 122*b*.

In a case where the above-described configuration is provided, fixed rotational directions of the inner pinion gear 122*a* and the inner pinion gear 122*b* of this embodiment are changed depending on the teeth meshing with the convex spherical member 126*b*.

As illustrated in FIG. 4, a case where the rotation axis 1301 of the inner pinion gear 122*a* is in the X-axis direction will be described. For example, in a case where the inner pinion gear 122*a* is in mesh with the convex spherical member 126*b* with the teeth closed in a circle, the convex spherical member can freely rotate about the Z-axis. For example, in a case where the inner pinion gear having the curved teeth is in mesh with the convex spherical member 126*b*, the convex spherical member 126*b* can freely rotate about each of the Z-axis and the Y-axis. Furthermore, for example, in a case where the inner pinion gear having the non-curved teeth is in mesh with the convex spherical member 126*b*, the convex spherical member 126*b* can freely rotate about the Y-axis.

As illustrated in FIG. 4, a case where the rotation axis 1302 of the inner pinion gear 122*b* is in the Y-axis direction will be described. For example, in a case where the inner pinion gear 122*b* is in mesh with the convex spherical member 126*b* with the teeth closed in a circle, the convex spherical member 126*b* can freely rotate about the X-axis. For example, in a case where the inner pinion gear having the curved teeth is in mesh with the convex spherical member 126*b*, the convex spherical member 126*b* can freely rotate about each of the Z-axis and the X-axis. Furthermore, for example, in a case where the inner pinion gear having the non-curved teeth is in mesh with the convex spherical member 126*b*, the convex spherical member 126*b* can freely rotate about the Z-axis.

As described above, in a case where the direction in which the inner pinion gear 122*a* and the convex spherical member 126*b* are rotatable and the direction in which the inner pinion gear 122*b* and the convex spherical member 126*b* are freely rotatable in meshing with each other coincide with each other, it is difficult to apply a load in the corresponding direction. Therefore, in this embodiment, the movable range (for example, ±20° to ±30°) of the grip 126*c* coupled to the convex spherical member 126*b* is limited in consideration of the range in which the teeth closed in a circle of the inner pinion gear 122*b* mesh with the convex spherical member 126*b*. This can suppress the influence of the case where a rotatable direction is generated.

The operation device 26 includes, for example, levers. A first lever (corresponding to, for example, the grip 126*c*) may be configured to be able to receive operations related to the arm 5 (arm cylinder 8) and the upper swing body 3 (swing operation) in accordance with, for example, operations in the front-rear direction and the left-right direction. A second lever may be configured to be able to receive operations related to the boom 4 (boom cylinder 7) and the bucket 6 (bucket cylinder 9) in accordance with operations in the front-rear direction and the left-right direction, for example. A third lever may be configured to be able to receive an operation of the lower traveling body 1 (crawler), for example.

Returning to FIG. 2, the shovel 100 may be operated by remote control. In a case of remote control, the controller 30 controls the electromagnetic valves included in the electromagnetic valve part 45 in accordance with operation signals received through the communication device T1, thereby achieving operations of various hydraulic actuators in accordance with the operation contents on the operation device used for remote control.

<Functional Blocks of Controller of Shovel>

By controlling each of the electromagnetic valves by an electric signal corresponding to the operation amount (for example, a lever operation amount) to increase or decrease the pilot pressure, the controller 30 can operate each of the control valves 171 to 176 in accordance with the operation content on the operation device 26. In this embodiment, a pressure detection sensor (not illustrated) may be provided to detect the pilot pressure increased or decreased in each of the electromagnetic valves. In such a case, the controller 30 can detect the pilot pressure as a detection result of the pressure detection sensor.

As described above, the controller 30 can achieve the raising and lowering of the boom 4, the opening and closing of the arm 5, the opening and closing of the bucket 6, the swing of the upper swing body 3, the travel of the lower traveling body 1, and the like in response to the operation signal from the operation device 26 or the operation signal by the remote operation.

The controller 30 according to this embodiment has what is known as a force feedback function which is a function to apply a force to the lever of the operation device 26 by outputting a control signal to the actuators 127*a* and 127*b*. Thus, for example, when the controller 30 receives an operation of tilting the lever of the operation device 26 in a predetermined direction (an example of the first direction), a force can be applied in a direction (an example of the second direction) opposite to the predetermined direction.

The force feedback function of this embodiment uses the control of the actuators 127*a* and 127*b* by the controller 30 as a function of presenting an appropriate operation direction to an operator.

For example, an inexperienced operator tends to perform inexperienced or inefficient operations. Therefore, in this embodiment, the operator is prompted to perform an appropriate operation based on design drawing information predetermined for construction. The design drawing information includes a shape of the construction target after construction. In this embodiment, an operation plan of the shovel 100 for the construction target to be the shape indicated in the design drawing information is set. The operation plan includes movement tracks of the attachment and the upper swing body 3 of the shovel 100 for construction. An operation procedure (operation flow) for the controller 30 according to this embodiment to operate each component (for example, at least one of the attachment and the upper swing body 3) of the shovel 100 in accordance with the movement track is set. When the operator performs an operation, if the operation is largely different from the operation in the registered operation procedure, the controller 30 applies a force to the lever (including the grip 126*c*) of the operation device 26 to present the set operation direction so that the operation is performed in the set operation procedure.

When a predetermined direction (the example of the first direction) is input by the operation device 26, the controller 30 presents a direction opposite to the predetermined direction (the example of the second direction corresponding to the first direction) to the operator operating the operation device 26 so that the operation is performed in accordance with the registered operation procedure. The controller 30 controls the actuators 127*a* and 127*b* to present a force in a direction opposite to the predetermined direction. Note that, in this embodiment, an example in which a direction opposite to a predetermined direction is presented will be described, but the direction is not limited to the opposite direction. For example, a force (load) in an operation direction for operating the attachment and the upper swing body 3 in accordance with the movement track may be presented. Furthermore, a force in a direction of rotation about the grip 126*c* may be presented. That is, in order for the operator to learn an appropriate operation, the controller 30 according to this embodiment presents at least a direction corresponding to a direction to which in input has been made by the operator. Thus, the operator can learn a suitable operation.

Each functional block in the controller 30 will be described. Each functional block in the controller 30 is conceptual, and is not necessarily physically configured as illustrated. All or some of the functional blocks may be configured to be functionally or physically distributed or integrated in any units. All or any part of the processing functions performed by the functional blocks is implemented by a program executed by the CPU. Alternatively, each functional block may be implemented by any given wired logic hardware. The program executed by the controller 30 according to this embodiment is not limited to be stored in the nonvolatile auxiliary storage device, and may be stored in a distributable storage medium or may be sent and received via a communication line.

The controller 30 according to this embodiment includes an acquiring part 30*a*, a signal output part 30*b*, a setting part 30*c*, a determining part 30*d*, and a presenting part 30*e* as functional blocks. The controller 30 is provided with an operation procedure storage part 30*f* in the nonvolatile auxiliary storage device.

The operation procedure storage part 30*f* stores operation procedure information indicating an operation procedure for operating each component (for example, at least one of the attachment and the upper swing body 3) of the shovel 100 in accordance with the movement track included in the above-described operation plan. The operation procedure information is, for example, information on a series of operations repeatedly performed in a predetermined work site according to the operation plan. The operation includes excavation, swing, loading of excavated sediment, and the like. The information on the series of operations includes the tilt amount of the lever of the operation device 26 and the time the lever is tilted in each process. Thus, the amount of operation performed on the operation device 26 can be specified for each process.

The acquiring part 30*a* acquires signals of various components in the shovel 100. For example, the acquiring part 30*a* acquires an operation signal from an operation content detection device 29. Thus, the controller 30 can recognize the operation content of the operator through the operation device 26. For example, the acquiring part 30*a* can recognize the direction in which the lever of the operation device

26 is tilted (the direction in which input is made by the operator) and the tilt amount.

The acquiring part 30a also acquires communication information from an external device through the communication device T1. For example, the acquiring part 30a acquires an operation signal by remote control. The acquiring part 30a acquires detection results of various sensors (for example, the boom angle sensor S1, the arm angle sensor S2, the bucket angle sensor S3, and the swing angular speed sensor S4). Furthermore, the acquiring part 30a acquires voice information detected by the sound collecting device A1 and image information obtained by the imaging device C1.

The signal output part 30b outputs a control signal for performing an operation corresponding to the operation content by the acquired operation signal. For example, the signal output part 30b generates a control signal for controlling the electromagnetic valve included in the electromagnetic valve part 45 for the operation corresponding to the operation content, and outputs the control signal to the electromagnetic valve part 45.

The setting part 30c sets the operation procedure information indicating the operation procedure including at least one direction in which the lever of the operation device 26 is tilted in order for the shovel 100 to perform a series of operations (an example of a predetermined operation). For example, the setting part 30c performs the setting by registering in the operation procedure storage part 30f the operation procedure information indicating the operation procedure for performing the series of operations based on the design drawing information acquired by the acquiring part 30a.

Any method may be used as a method of setting the operation procedure information. For example, the setting part 30c may generate an operation plan including at least one of movement tracks of the attachment and the upper swing body 3 of the shovel 100 so that the target to be constructed has the shape indicated in the design drawing information. The setting part 30c also may set and register in the operation procedure storage part 30f, as the operation procedure information, an operation procedure indicating a series of operations for operating at least one of the attachment and the upper swing body 3 according to the movement track indicated in the operation plan.

Furthermore, the setting part 30c may set and register in the operation procedure storage part 30f, as the operation procedure information, an operation procedure indicated by a set of parameters (for example, a swing angle and the like) received from an external device through the communication device T1. Thus, by referring to the operation procedure information, a direction (a tilt direction of the lever) input and an amount (a tilt amount of the lever) input in the direction in time series when the series of operations is performed can be specified.

The determining part 30d performs various determinations based on the signal or the like acquired by the acquiring part 30a. For example, when a predetermined direction is input to the operation device 26 (when the lever is tilted) while a series of repetitive works is performed, the determining part 30d determines whether or not information (the direction in which the lever is tilted and the tilt amount) of the direction (the example of the first direction) input to the operation device 26 is different from information of a direction (an example of a third direction) indicated in the operation procedure set as the operation procedure information by equal to or more than a predetermined threshold value. Note that, the predetermined threshold value is a value determined according to each embodiment, such as a specific work, accuracy required when forming a shape indicated in the design drawing information, or the like, and a description thereof will be omitted.

That is, the determining part 30d determines whether or not the input operation is deviated by equal to or more than a predetermined threshold value compared to the operation for performing the operation according to the movement track indicated by the operation plan. In this embodiment, the method of the operation to operate according to the movement track indicated in the operation plan is not limited to a method of setting in advance, and the determination may be performed using a trained model obtained by machine learning the operation procedure corresponding to the design drawing information in accordance with the input of a combination of the design drawing information and the actual operation performed.

When a predetermined direction (the example of the first direction) is input to the operation device 26, and the determining part 30d determines that the information of the input predetermined direction is different from the information of the operation direction (the example of the third direction) indicated in the operation procedure information by more than the predetermined threshold value, the presenting part 30e presents a direction (the example of the second direction) opposite to the input predetermined direction to the operator operating the operation device 26.

As a method of presenting a direction, the presenting part 30e according to this embodiment controls the actuators 127a and 127b so as to apply a force to the lever (including the grip 126c) of the operation device 26 in a direction opposite to the predetermined direction in which the lever (including the grip 126c) is tilted.

For example, during the swing operation, a reaction force is applied to the lever (including the grip 126c) of the operation device 26 at a timing when the shovel 100 reaches an appropriate swing angle. Thus, the operator can recognize an appropriate timing to end the swing operation.

<Operation Procedure for Shovel>

In this embodiment, the above-described configuration enables the operator to learn an appropriate operation. Next, processes of a series of operations in the controller 30 according to this embodiment will be described.

Figure 5:
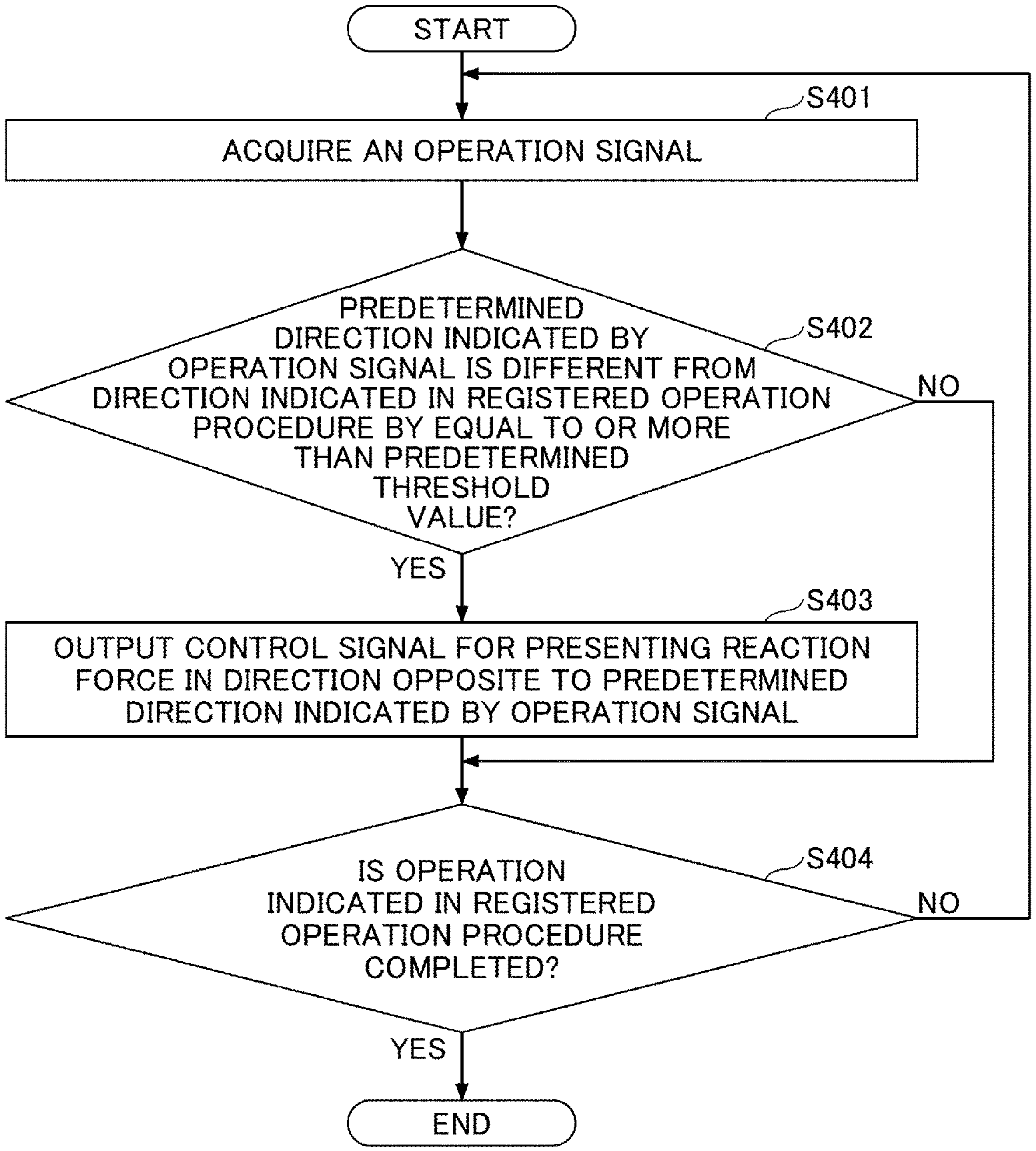
FIG. 5 is a flowchart illustrating processes when a series of operations of the shovel is performed in a controller according to the embodiment.

FIG. 5 is a flowchart illustrating processes when a series of operations of the shovel 100 is performed in the controller 30 according to this embodiment. Before the processes illustrated in FIG. 5, the operation procedure information for performing the series of operations is set and registered in the operation procedure storage part 30f in advance.

The acquiring part 30a acquires an operation signal indicating a predetermined direction, which is input through the operation device 26, from the operation content detection device 29 during the series of operations (S401).

The determining part 30d then determines whether or not information of the predetermined direction indicated by the acquired operation signal is different from information of the direction corresponding to the current operation procedure in the operation procedure information registered in the operation procedure storage part 30f by equal to or more than a predetermined threshold value (S402). If it is determined that the difference between the information of the input predetermined direction and the information of the direction corresponding to the current operation procedure is within the predetermined threshold value (S402: NO), the process proceeds to S404.

If the determining part 30d determines that the difference between the information of the direction in which input has been made and the information of the direction corresponding to the current operation procedure is equal to or more than the predetermined threshold value (S402: YES), the presenting part 30*e* outputs a control signal for presenting a reaction force in a direction opposite to the direction in which input has been made to the actuators 127*a* to 127*d* (S403).

The determining part 30*d* then determines whether or not all of the operation procedure of the series of operations in the operation procedure information has been completed (S404). If it is determined that all of the operation procedure of the series of operations has not been completed (S404: NO), the process is performed again from S401.

If it is determined that all of the operation procedure of the series of operations in the operation procedure information has been completed (S404: YES), the determining part 30*d* ends the process of the determination and the like in the series of operations.

In this embodiment, by performing the processes according to the above-described procedure, and presenting a direction opposite to the direction in which input has been made based on the operation procedure information of the series of operations set in advance, the operator can perform the operation after recognizing the operation required when forming the shape indicated in the design drawing information. The operator performs the operation after recognizing whether or not the operation is different from the operation in the operation procedure which is based on the operation plan in the design drawing information, thereby achieving an improvement in work efficiency.

In this embodiment, the case where the operation device 26 has the above-described configuration has been described. In the operation device 26, a driving force from the actuators 127*a* and 127*b* is transmitted to the convex spherical member 126*b* of the movable part 126*a*, and thus force feedback can be easily performed on the movable part 126*a* provided with the grip 126*c*.

That is, in a joystick for operating a conventional construction machine, a method of presenting a force for the operator by connecting a rotary actuator to a rotary axis and driving the actuator has been widely used. In this method, since the actuator is arranged, the size tends to increase and the structure tends to become complicated. On the other hand, the operation device 26 of this embodiment includes a configuration capable of transmitting a driving force to the convex spherical member 126*b*, and thus a structure capable of force feedback can be achieved in a space-saving manner.

In this embodiment, the case where the controller 30 and the operation device 26 are configured separately has been described. However, a part of the configuration of the controller 30 for performing control related to the operation device 26 may be stored in the operation device 26 to form an operation unit. Furthermore, the controller 30 and the operation device 26 may be combined into a single device serving as an operation unit. The same applies to the following embodiments.

In this embodiment, by using the operation device 26 having the above-described configuration, a normative operation track can be presented to the operator. Thus, the operator can improve the work efficiency by performing the operation in consideration of the operation procedure which is based on the operation plan in the design drawing information. Furthermore, since the operation procedure based on the operation plan in the design drawing information is provided, the operator can intuitively learn the operation or the like in which the work amount becomes optimal with respect to the consumed fuel.

Another Embodiment

In the above-described embodiment, an example has been described in which a load is presented by an actual (driving) force that has driven the actuators 127*a* and 127*b* in a direction opposite to the direction in which input has been made. However, the above-described embodiment is not limited to the method of applying an actual force in order to present the direction opposite to the direction in which input has been made. Therefore, in another embodiment, an example of presenting a direction with a pseudo force will be described.

Figure 6B:
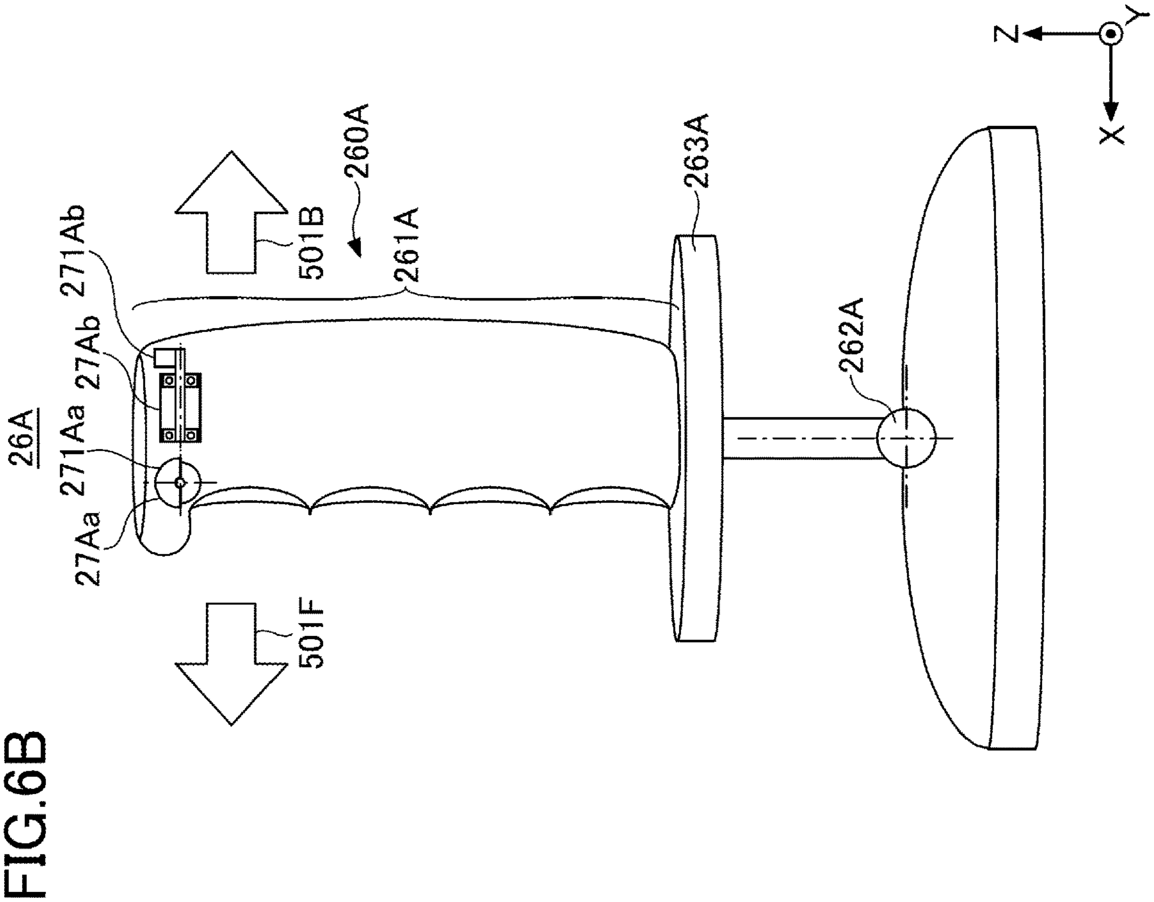
FIG. 6A and FIG. 6B are diagrams illustrating a schematic configuration example of a lever provided in an operation device according to another embodiment.
Figure 6A:
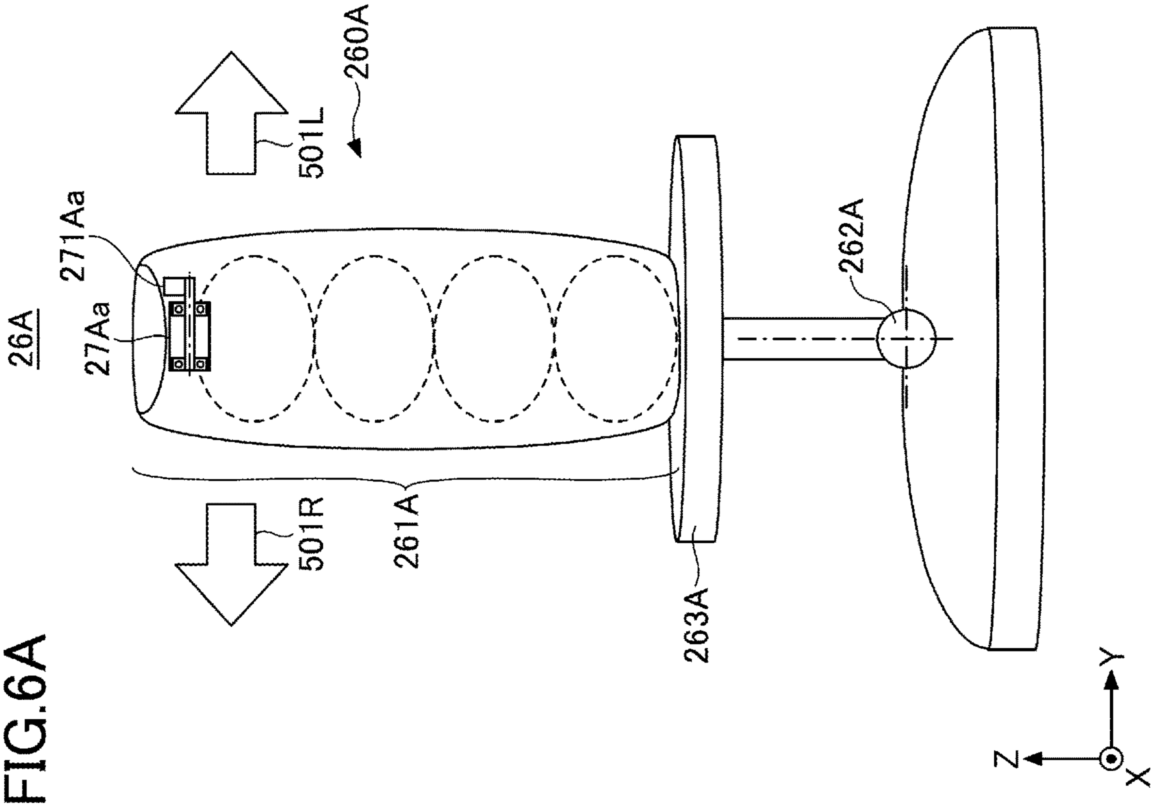

An operation device 26A according to this embodiment will be described. FIG. 6A and FIG. 6B are diagrams illustrating a schematic configuration example of a lever 260A provided in the operation device 26A according to this embodiment. FIG. 6A is a front view of the lever 260A, and FIG. 6B is a side view of the lever 260A. The lever 260A is provided with a grip 261A for the operator to grip and a support member 263A for supporting the grip 261A from below. The grip 261A may be provided with a button (not illustrated) for the operator to press.

As illustrated in FIG. 6A and FIG. 6B, the lever 260A is provided with the grip 261A in the upward direction (Z-axis positive direction) from a shaft bearing 262A. Furthermore, the grip 261A is provided so as to be able to tilt in a horizontal plane (XY coordinate plane) direction with respect to the shaft bearing 262A.

Specifically, the grip 261A can be tilted in a right direction (Y-axis negative direction) 501R and a left direction (Y-axis positive direction) 501L with respect to the shaft bearing 262A. The grip 261A can also be tilted in a forward direction (Y-axis positive direction) 501F and a backward direction (Y-axis negative direction) 501B with respect to the shaft bearing 262A. In such a way, the grip 261A according to this embodiment can be tilted in two axial directions orthogonal to each other.

The lever 260A according to this embodiment is capable of input in two axial (an example of multiple axes) directions orthogonal to each other as described above.

The lever 260A is provided with an operation content detection device 29A (not illustrated). Thus, the operation content detection device 29A detects the operation content (for example, the operation direction and the operation amount) in the front-rear direction with respect to the lever 260A, and detects the operation content (for example, the operation direction and the operation amount) in the left-right direction with respect to the lever 260A.

Specific, the operation content detection device 29A is, for example, a tilt sensor that detects a tilt angle of the lever 260A, an angle sensor that detects a swing angle around a swing shaft of an operation lever, or the like. The operation content detection device 29A may be configured by other sensors such as a pressure sensor, a current sensor, a voltage sensor, or a range sensor.

The lever 260A is provided with vibration mechanisms corresponding to directions in which the lever can be tilted. For example, the lever 260A according to this embodiment includes a first vibration mechanism 27Aa that vibrates the lever 260A in the front-rear direction (X-axis direction) and a second vibration mechanism 27Ab that vibrates the lever 260A in the left-right direction (Y-axis direction). In such a way, the first vibration mechanism 27Aa and the second vibration mechanism 27Ab are arranged so that the operation directions are orthogonal to each other.

As illustrated in FIG. 6B, the first vibration mechanism 27Aa and the second vibration mechanism 27Ab are provided on the end portion side of the grip 261A in the upward direction (Z-axis positive direction).

This embodiment is not limited to the method of arranging the first vibration mechanism 27Aa and the second vibration mechanism 27Ab on the end portion side of the grip 261A in the upward direction (Z-axis positive direction) as illustrated in FIG. 6B, and the first vibration mechanism and the second vibration mechanism may be provided at appropriate positions according to each embodiment. For example, when the first vibration mechanism 27Aa and the second vibration mechanism 27Ab are relatively large, it is preferable to arrange the grip 261A so that the grip does not have an excessively large diameter. This allows for the operator to easily grip the grip 261A.

The first vibration mechanism 27Aa and the second vibration mechanism 27Ab are controlled to vibrate in accordance with a vibration signal from the presenting part 30*e* of the controller 30.

In the first vibration mechanism 27Aa and the second vibration mechanism 27Ab illustrated in FIG. 6B, each of the centers of gravity of pendulums (weights) 271Aa and 271Ab is shifted (displaced) from the rotation axis. Therefore, the controller 30 controls each of rotation speed of the first vibration mechanism 27Aa and the second vibration mechanism 27Ab in accordance with the phase of the center of gravity of the corresponding pendulum, thereby generating a force only in a desired direction.

In this embodiment, it is conceivable to use an eccentric DC motor (rotary motor) as the first vibration mechanism 27Aa and the second vibration mechanism 27Ab, but it is not limited thereto, and a voice coil motor may be applied, or a linear vibrator such as a solenoid coil may be applied. Furthermore, in this embodiment, it is not limited to the method of operating only one of the first vibration mechanism 27Aa and the second vibration mechanism 27Ab. For example, in a case where eccentric rotary motors are used as the first vibration mechanism 27Aa and the second vibration mechanism 27Ab, control may be performed to cancel forces in directions other than a desired direction by combining the operations of the first vibration mechanism 27Aa and the second vibration mechanism 27Ab.

As described above, the first vibration mechanism 27Aa and the second vibration mechanism 27Ab have a mechanism capable of vibrating.

The first vibration mechanism 27Aa and the second vibration mechanism 27Ab according to this embodiment present a pseudo force in a direction in the vibration direction. That is, in this embodiment, a reaction force in a direction corresponding to a direction in which input has been made by the operator can be presented with a pseudo force in a direction in the vibration direction.

<Description of Vibration that Generates Pseudo Force>

Figure 7A:
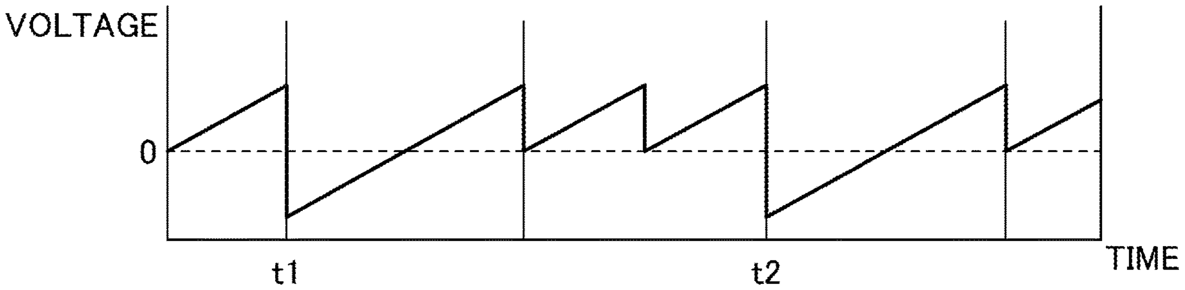
FIG. 7A to FIG. 7D are diagrams illustrating waveform examples of a vibration signal for generating vibration in order to generate a pseudo force on the lever of the operation device according to the embodiment.

FIG. 7A to FIG. 7D are diagrams illustrating waveform examples of a vibration signal for generating vibration in order to generate a pseudo force on the lever 260A of the operation device 26A according to this embodiment. In each example illustrated in FIG. 7A, the horizontal axis represents time and the vertical axis represents voltage. An example in which a sawtooth wave is generated is illustrated in FIG. 7A.

In the vibration signal illustrated in FIG. 7A, in a period from a time t1 to a time t2, displacement in the negative direction occurs once, and then displacement in the positive direction occurs three times with respect to "0" (reference value) of the vertical axis. In other words, the vibration signal illustrated in FIG. 7A is a sawtooth wave in which the displacement in the positive direction and the displacement in the negative direction occur at a ratio of 3:1.

As illustrated in FIG. 7A, the presenting part 30*e* generates a vibration signal in which a waveform of a specific pattern in which the number of displacements in the positive direction and the number of displacements in the negative direction are different from each other in the amplitude direction of the vibration signal is repeated in a predetermined cycle. When the part of the operator touches the object vibrating in accordance with the vibration signal, the operator can feel a force pulling in the direction of the vibration.

This embodiment is not limited to the example in which the sawtooth wave of 3:1 is generated by the vibration signal as illustrated in FIG. 7A.

Figure 7B:
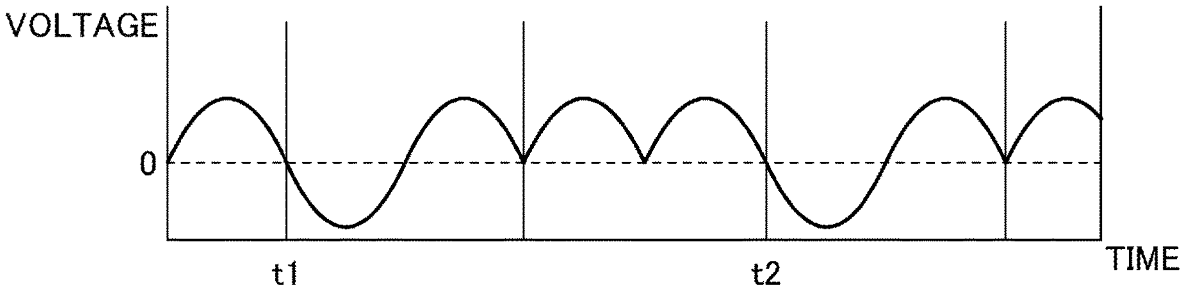
Figure 7C:
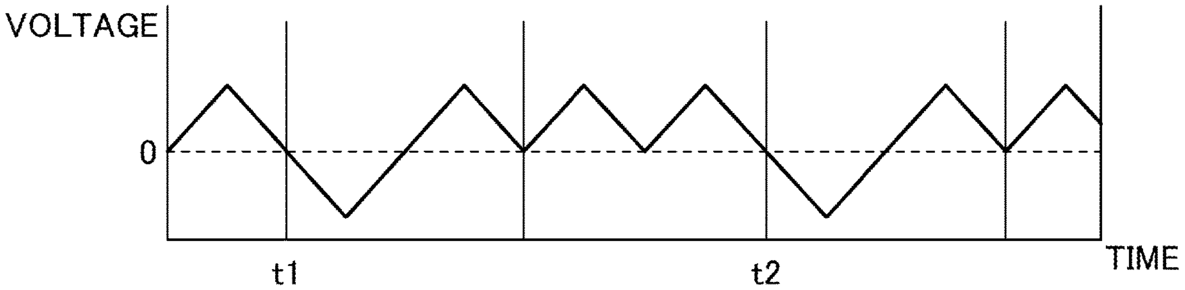
Figure 7D:
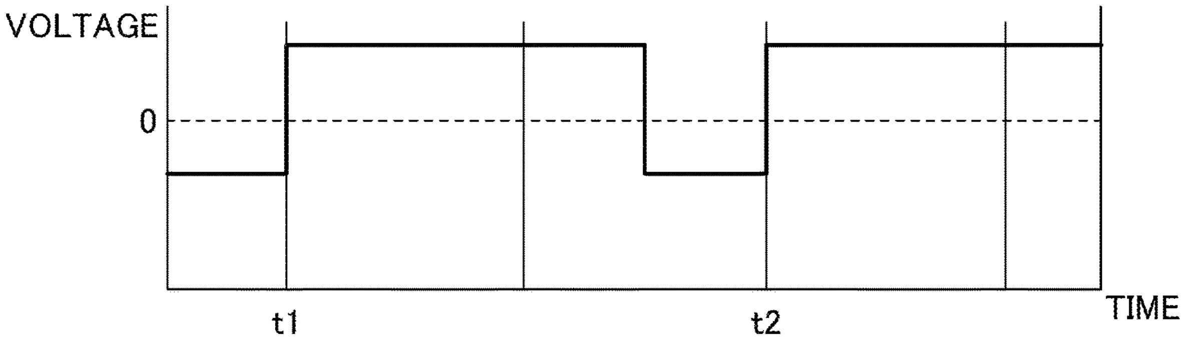

For example, a 3:1 sine wave as illustrated in FIG. 7B may be used as the vibration signal. A 3:1 triangular wave as illustrated in FIG. 7C may be used as the vibration signal. Furthermore, a 3:1 rectangular wave as illustrated in FIG. 7D may be used as the vibration signal.

In this embodiment, an example in which vibration is generated at a ratio of positive and negative frequencies of 3:1 has been described, but the ratio is not limited to 3:1, and any ratio such as 2:1 or 4:1 may be used as long as the vibration generates a pseudo force to the operator. That is, the presenting part 30*e* according to this embodiment generates a vibration signal with a waveform asymmetric with respect to the reference value "0" of the vertical axis illustrated in FIG. 7A, and outputs the vibration signal to at least one of the first vibration mechanism 27Aa and the second vibration mechanism 27Ab.

Figure 8:
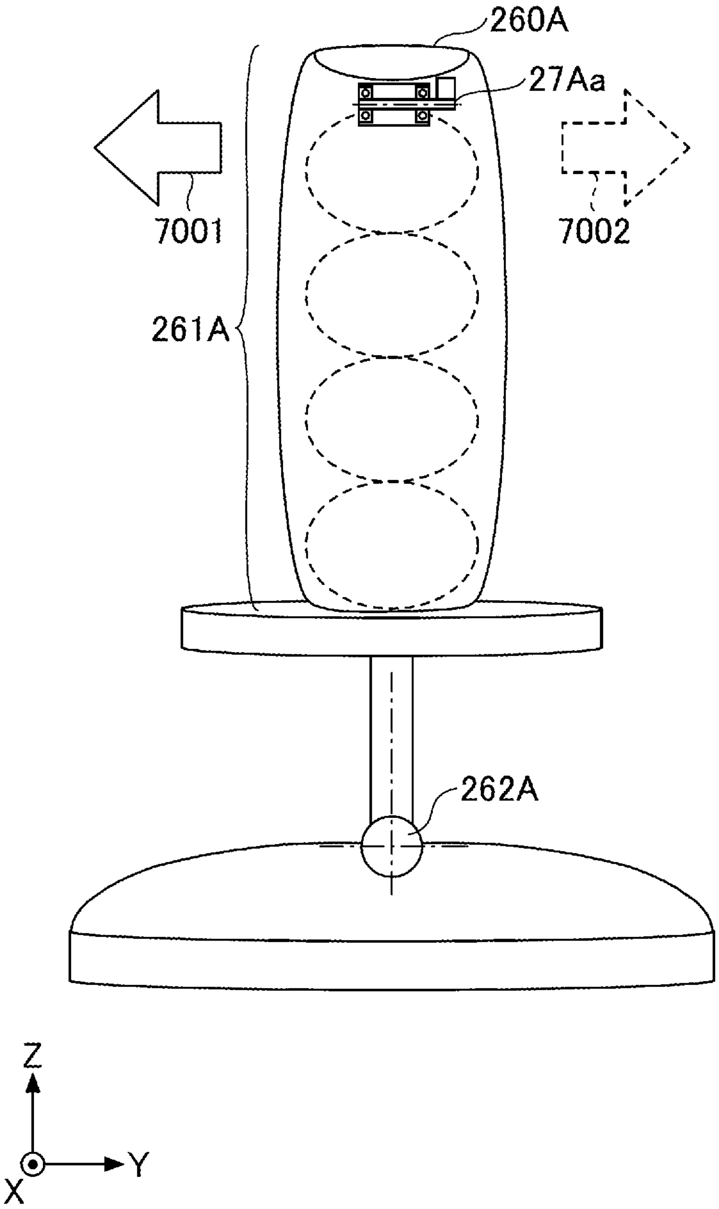
FIG. 8 is a diagram illustrating examples of a direction in which a pseudo force is generated when the lever is operated.

FIG. 8 is a diagram illustrating examples of a direction in which a pseudo force is generated when the lever 260A is operated. In the example illustrated in FIG. 8, it is assumed that an operation of tilting the lever 260A in a right direction 7001 is performed. For example, when the left-right direction of the lever 260A corresponds to the swing of the upper swing body 3, the presenting part 30*e* generates a vibration signal for generating a pseudo force that makes the operator feel a reaction force in a left direction 7002 at the time when it is determined that the swing of the upper swing body 3 is completed in the series of operations, and outputs the vibration signal to the second vibration mechanism 27Ab of the lever 260A. Thus, the operator can recognize that the swing operation should be ended.

In the operation device 26A, the levers 260A may be provided to operate the shovel 100. For example, a right lever and a left lever may be provided as the operation device 26A.

In this embodiment, the lever 260A of the operation device 26A having the first vibration mechanism 27Aa and the second vibration mechanism 27Ab can present a reaction force by the pseudo force in a direction corresponding to a direction in which input has been made by the operator. That is, conventional operation devices tend to be large and complicated due to the arrangement of the actuators, but the operation device 26A of this embodiment has the above-described configuration, and thus space saving can be achieved and force feedback for presenting a predetermined direction can easily be achieved by a pseudo force.

In this embodiment, since the first vibration mechanism 27Aa and the second vibration mechanism 27Ab are provided in a region that does not interfere with the mechanism part of the lever 260A of the operation device 26A, a pseudo force which makes the operator to feel to be pulled in any direction can be presented to the operator. Furthermore, since the mechanism part of the lever 260A of the operation device 26A can be suppressed from being complicated, the robustness can be secured and the cost can be reduced.

First Modified Example of Another Embodiment

In the above-described embodiment, the example in which the first vibration mechanism 27Aa and the second vibration mechanism 27Ab are provided at the upper end portion of the grip 261A has been described. However, a method of providing the vibration mechanism is not limited to the method of providing the vibration mechanism at the upper end of the grip side 261A as illustrated in this embodiment. Therefore, in a first modified example of this embodiment, an example in which the vibration mechanism is provided at another position will be described.

Figure 9B:
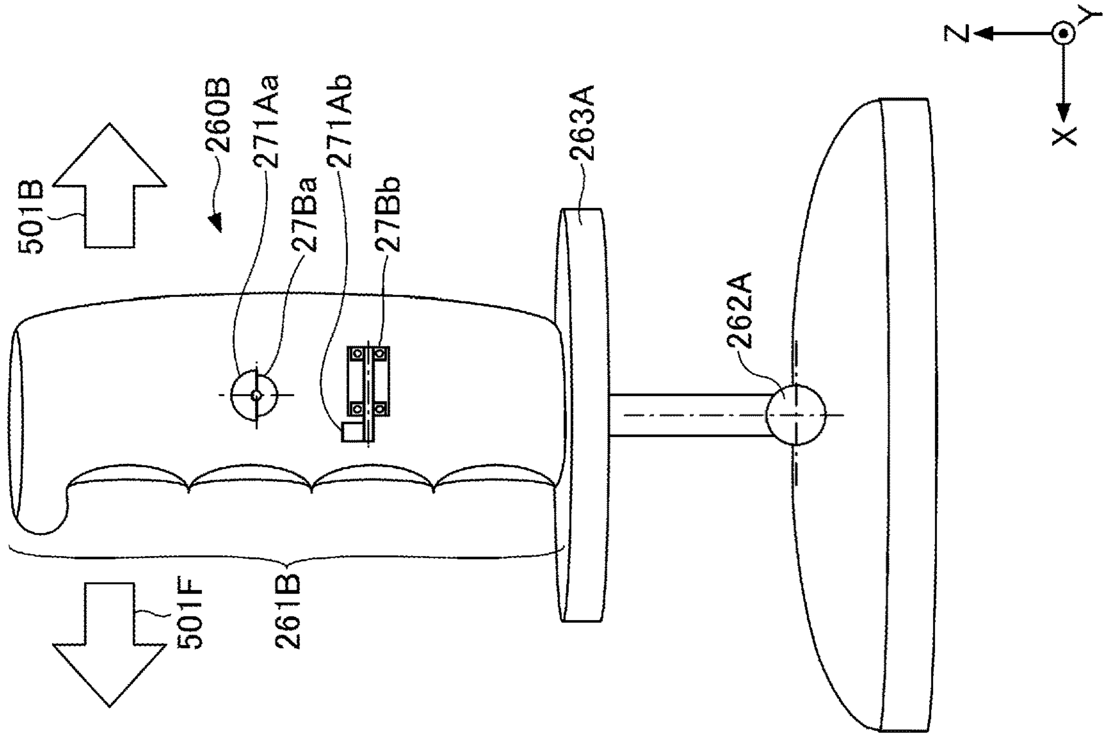
FIG. 9A and FIG. 9B are diagrams illustrating a schematic configuration of a lever provided in an operation device according to a first modified example of the embodiment.
Figure 9A:
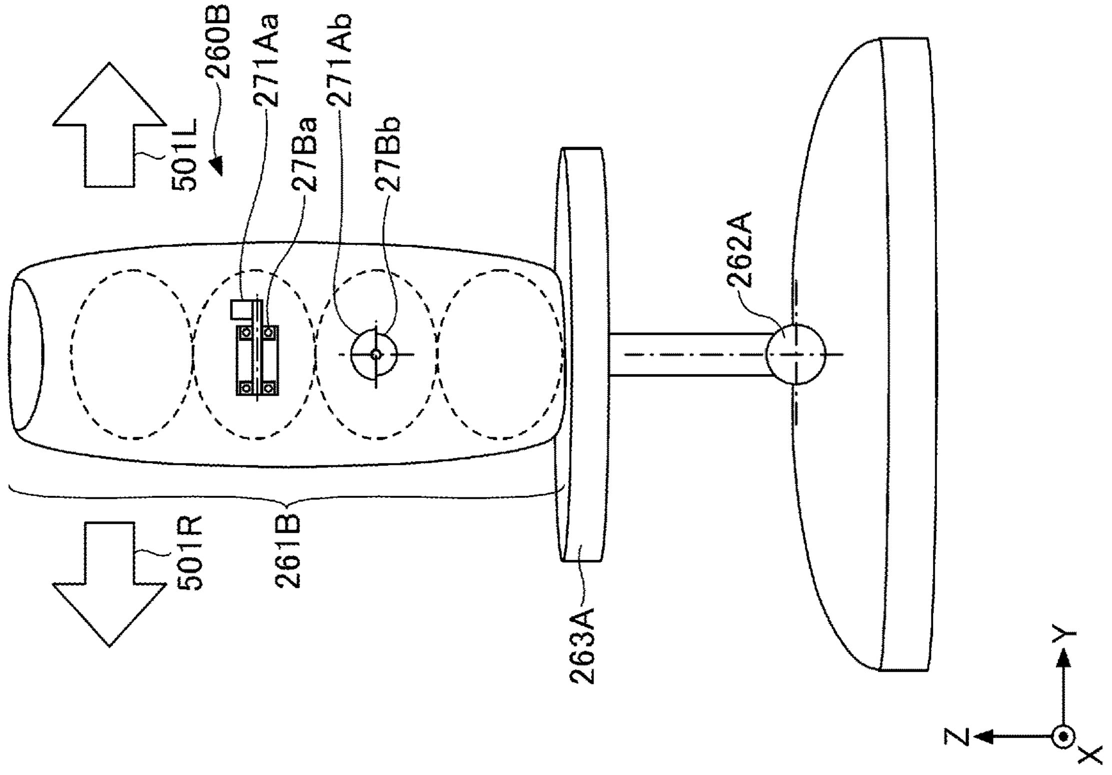

FIG. 9A and FIG. 9B are diagrams illustrating a schematic configuration example of a lever 260B provided in an operation device 26B according to the present modified example. FIG. 9A is a front view of the lever 260B, and FIG. 9B is a side view of the lever 260B. Note that, the same reference numerals are assigned to the same components as those in the above-described embodiment, and the description thereof will be omitted.

The lever 260B is provided with a grip 261B for the operator to grip. The grip 261B may be provided with a button (not illustrated) for the operator to press.

As illustrated in FIG. 9A and FIG. 9B, the lever 260B is provided with a grip 261B in the upward direction (Z-axis positive direction) from the shaft bearing 262A. Furthermore, the grip 261B is provided so as to be able to tilt in a horizontal plane (XY coordinate plane) direction with respect to the shaft bearing 262A.

In this modified example, a first vibration mechanism 27Ba that vibrates the grip 261B in the front-rear direction (X-axis direction) and a second vibration mechanism 27Bb that vibrates the grip 261B in the left-right direction (Y-axis direction) are provided. In such a way, the first vibration mechanism 27Ba and the second vibration mechanism 27Bb are arranged so that the operation directions are orthogonal to each other.

As illustrated in FIG. 9A and FIG. 9B, the first vibration mechanism 27Ba and the second vibration mechanism 27Bb are provided in the vicinity of the center of the grip 261B in the Z-axis direction. As in the above-described embodiment, in the first vibration mechanism 27Ba and the second vibration mechanism 27Bb, each of the centers of gravity of pendulums (weights) 271Aa and 271Ab is shifted (displaced) from the rotation axis.

The first vibration mechanism 27Ba and the second vibration mechanism 27Bb according to the present modified example present a pseudo force in a direction in the vibration direction, similarly to the above-described embodiment.

In the present modified example, since the first vibration mechanism 27Ba and the second vibration mechanism 27Bb are provided in the vicinity of the center of the grip 261B, and thus the first vibration mechanism 27Ba and the second vibration mechanism 27Bb are wrapped when the operator grips the grip 261B, a desired force represented by a pseudo force can be presented to the operator more precisely and with a few errors. Furthermore, the distances from the shaft bearing 262A to the first vibration mechanism 27Ba and the second vibration mechanism 27Bb are also shorter than those in this embodiment. Therefore, even when the first vibration mechanism 27Ba and the second vibration mechanism 27Bb are heavy, the inertia force by the first vibration mechanism 27Ba and the second vibration mechanism 27Bb can be reduced as compared with this embodiment, and thus, the operability can be improved.

This embodiment and the modified example are examples of the arrangement of the vibration mechanisms, and the arrangement of the vibration mechanisms is not limited thereto. The vibration mechanism is provided on the grip side (the Z-axis positive direction side) with respect to the shaft bearing 262A of the lever. The vibration mechanism may be provided, for example, inside the support member 263A provided below the grip.

Second Modified Example of Another Embodiment

In the above-described embodiment, the case where the first vibration mechanism 27Aa and the second vibration mechanism 27Ab are built in the operation device 26A has been described. The first vibration mechanism 27Aa and the second vibration mechanism 27Ab do not need to interfere with the mechanism part of the operation device 26A. In other words, the first vibration mechanism 27Aa and the second vibration mechanism 27Ab do not need to be built in the operation device 26A.

In this modified example, an example in which an attachable/detachable member incorporating the first vibration mechanism 27Aa and the second vibration mechanism 27Ab is attachable/detachable to/from the lever of the operation device 26A will be described.

Figure 10B:
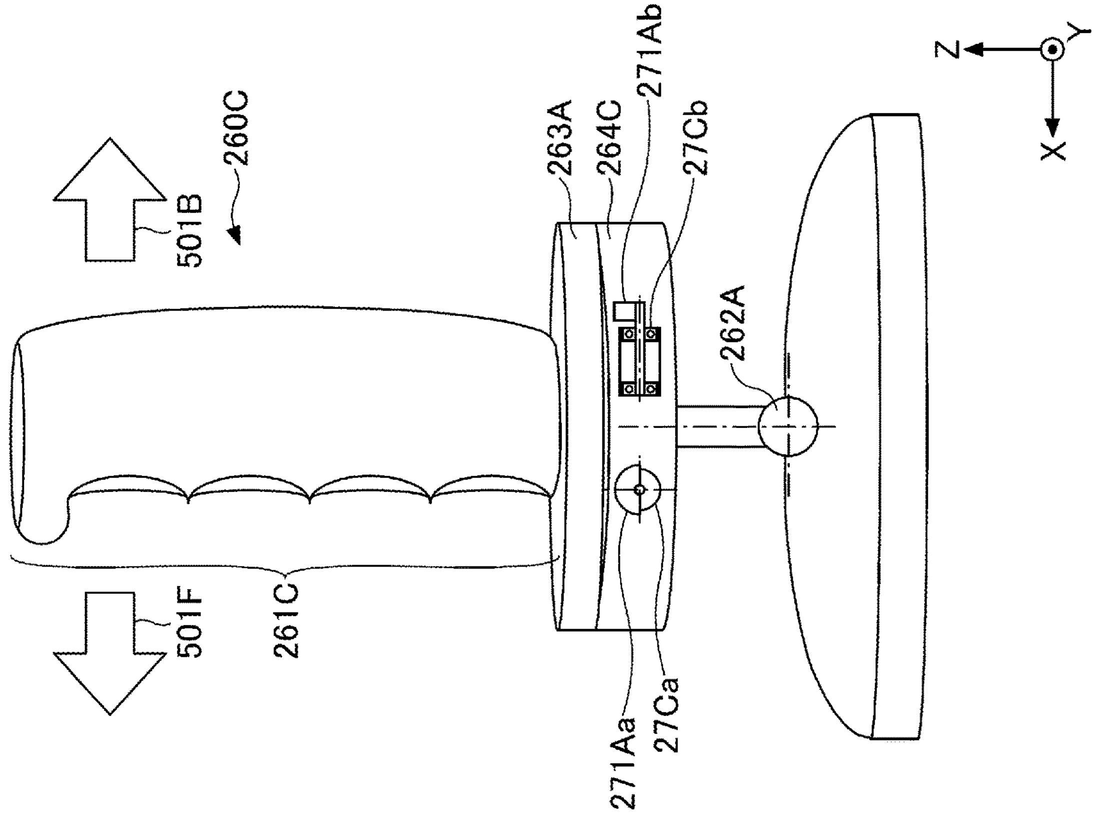
FIG. 10A and FIG. 10B are diagrams illustrating a schematic configuration example of a lever provided in an operation device according to a second modified example of the embodiment.
Figure 10A:
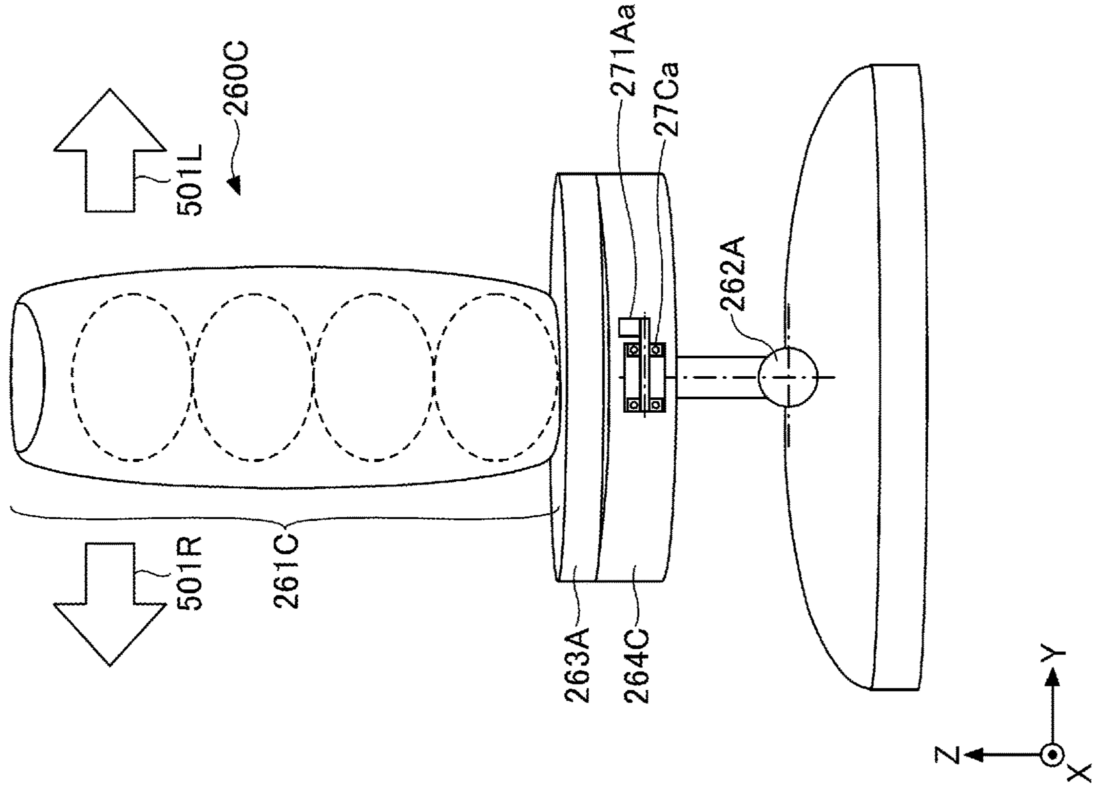

FIG. 10A and FIG. 10 B are diagrams illustrating a schematic configuration example of a lever 260C provided in an operation device 26C according to the present modified example. FIG. 10A is a front view of the lever 260C, and FIG. 10B is a side view of the lever 260C. The same reference numerals are assigned to the same components as those in the above-described embodiment, and the description thereof will be omitted.

The lever 260C is provided with a grip 261C for the operator to grip. The grip 261C may be provided with a button (not illustrated) for the operator to press. Furthermore, the lever 260C according to the present modified example is configured such that an attachable/detachable member 264C is provided to be attachable/detachable under the support member 263A.

Figure 11:
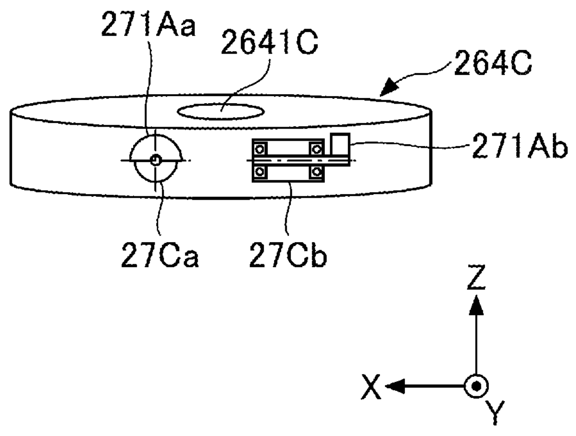
FIG. 11 is a diagram illustrating a configuration example of an attachable/detachable member according to the second modified example of the embodiment.

FIG. 11 is a diagram illustrating a configuration example of the attachable/detachable member 264C according to the second modified example of this embodiment. As illustrated in FIG. 11, in the attachable/detachable member 264C, a first vibration mechanism 27Ca for vibrating the lever 260C in the front-rear direction (X-axis direction) and a second vibration mechanism 27Cb for vibrating the lever 260C in the left-right direction (Y-axis direction) are provided. In such a way, the first vibration mechanism 27Ca and the second vibration mechanism 27Cb are arranged so that the operation directions are orthogonal to each other.

The attachable/detachable member 264C illustrated in FIG. 11 can be attached to the lever 260C as necessary. For example, a terminal is provided on an inner surface 2641C of the attachable/detachable member 264C for connecting to the lever 260C. In a case where the attachable/detachable member 264C is attached to the lever 260C, a signal for vibrating the first vibration mechanism 27Ca and the second vibration mechanism 27Cb is input via the terminal.

As illustrated in FIG. 10B, by attaching the attachable/detachable member 264C to the lever 260C according to the present modified example, the first vibration mechanism 27Ca and the second vibration mechanism 27Cb can present a pseudo force in a direction in the vibration direction, similarly to the above-described embodiment.

For example, when the operator is not skilled, the attachable/detachable member 264C is attached to the lever 260C. Thus, the operator can learn the operation required to form the shape indicated in the design drawing information, as in the above-described embodiment. Furthermore, in a case where learning is not required, the attachable/detachable member 264C can be removed, and therefore, the lever 260C can be reduced in weight, and improvement in operability can be achieved.

Yet Another Embodiment

In the above-described embodiments, the case where a force or a pseudo force in a direction corresponding to the direction in which input has been made is presented in order for the operator to learn the operation required when forming the shape indicated in the design drawing information has been described. However, the above-described embodiments are not limited to the case where the presentation of the force or the pseudo force in the direction corresponding to the direction in which input has been made is performed when the operation required to form the shape indicated in the design drawing information is learned. In yet another embodiment, a case where a load corresponding to the operation of the shovel 100 is presented to the operator who performs remote control will be described. In this embodiment, an example in which the operation device 26A of this embodiment is used for remote control to present a direction with a pseudo force will be described. The operation device 26 of this embodiment described above may be used to present a direction by a force.

<Configuration Example of Electric System of Shovel>

Figure 12:
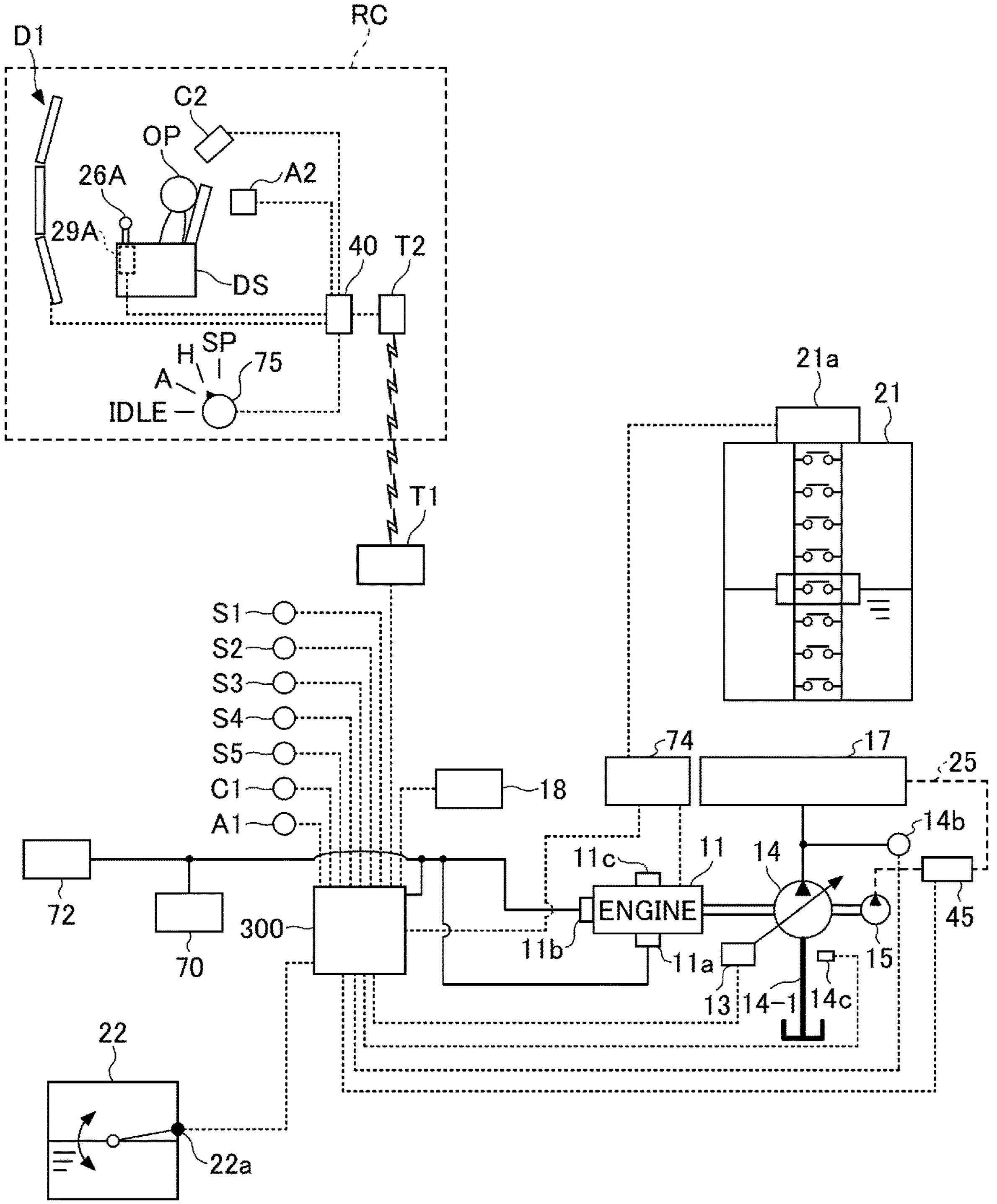
FIG. 12 is a diagram illustrating a configuration example of an electric system mounted on a shovel according to yet another embodiment.

FIG. 12 is a diagram illustrating a configuration example of an electric system mounted on the shovel 100. The engine 11 is connected to the engine control part 74. Various data indicating the state of the engine 11 is transmitted from the engine control part 74 to a controller 300. The controller 300 is configured to be able to accumulate various data indicating the state of the engine 11 in the nonvolatile auxiliary storage device inside the controller 300.

A battery 70 is configured to supply electric power to various electric loads mounted on the shovel 100. An alternator 11*a* (generator), a starter 11*b*, the controller 300, an electrical component 72, and the like are configured to operate with the electric power stored in the battery 70. The starter 11*b* is driven by the electric power stored in the battery 70 to start the engine 11. The battery 70 is configured to be charged with the electric power generated by the alternator 11*a*.

A water temperature sensor 11*c* transmits information on the temperature of the engine coolant to the controller 300. The regulator 13 transmits data on the tilt angle of the swash plate to the controller 300. A discharge pressure sensor 14*b* transmits data on the discharge pressure of the main pump 14 to the controller 300. The positioning device 18 transmits data on the position of the shovel 100 to the controller 300.

An oil temperature sensor 14*c* is provided in a pipe line 14-1 between the main pump 14 and a hydraulic oil tank in which the hydraulic oil sucked by the main pump 14 is stored. The oil temperature sensor 14*c* transmits information on the temperature of the hydraulic oil flowing through the pipe line 14-1 to the controller 300.

An aqueous urea level sensor 21*a* provided in an aqueous urea tank 21 transmits information on the remaining amount of the aqueous urea to the controller 300. A fuel level sensor 22*a* provided in a fuel tank 22 transmits data on the fuel level to the controller 300.

The communication device T1 is configured to transmit and receive information to and from a communication device T2 installed in a remote control room RC via wireless communication. In this embodiment, the communication device T1 and the communication device T2 are configured to transmit and receive information via a fifth generation mobile communication line (5G line), an LTE line, a satellite communication system, or the like.

<Configuration Example of Electric System of Remote Control Room>

In the remote control room RC, a remote controller 40, a sound output device A2, an indoor imaging device C2, a display device D1, the communication device T2, and the like are installed. Furthermore, a driver's seat DS on which an operator OP who remotely operates the shovel 100 sits is installed in the remote control room RC.

The remote controller 40 is a computing device that executes various computations. In this embodiment, the remote controller 40 is configured by a microcomputer including a CPU and a memory, similarly to the controller 300. The various functions of the remote controller 40 are implemented by the CPU executing the program stored in the memory.

The sound output device A2 is configured to output sound. In this embodiment, the sound output device A2 is a speaker, and is configured to reproduce the sound collected by the sound collecting device A1 attached to the shovel 100.

The indoor imaging device C2 is configured to capture images of the inside of the remote control room RC. In this embodiment, the indoor imaging device C2 is a camera installed inside the remote control room RC, and is configured to capture images of the operator OP seated on the driver's seat DS.

The communication device T2 is configured to control wireless communication with the communication device T1 attached to the shovel 100.

In this embodiment, the driver's seat DS has a structure similar to that of a driver's seat installed in a cabin of a normal shovel. Specifically, a left console box is disposed on the left side of the driver's seat DS, and a right console box is disposed on the right side of the driver's seat DS. The operation device 26A described in the above embodiment is provided in the driver's seat. As the operation device 26A, a left operation lever is disposed at a front end of the upper surface of the console box, and a right operation lever is disposed at a front end of the upper surface of the right console box. A travel lever and a travel pedal are disposed in front of the driver's seat DS. An engine speed adjustment dial 75 is also disposed at the center of the upper surface of the right console box.

The engine speed adjustment dial 75 is a dial for adjusting the speed of the engine 11, and is configured to be able to switch the engine speed in four stages, for example.

Specifically, the engine speed adjustment dial 75 is configured to be able to switch the engine speed in four stages of an SP mode, an H mode, an A mode, and an idling mode. The engine speed adjustment dial 75 transmits data on the setting of the engine speed to the controller 300.

The SP mode is an engine speed mode selected when the operator OP wants to prioritize the work amount, and uses the highest engine speed. The H mode is an engine speed mode selected when the operator OP wants to achieve both the work amount and the fuel efficiency, and uses the second highest engine speed. The A mode is an engine speed mode selected when the operator OP wants to operate the shovel with low noise while giving priority to fuel efficiency, and uses the third highest engine speed. The idling mode is an engine speed mode selected when the operator OP wants to set the engine to an idling state, and uses the lowest engine speed. The engine 11 is controlled to rotate at a constant speed in the speed mode selected by the engine speed adjustment dial 75.

The operation device 26A is provided with the operation content detection device 29A for detecting the operation content of the operation device 26A. The operation content detection device 29A outputs information on the detected operation content of the operation device 26A to the remote controller 40. The remote controller 40 generates an operation signal based on the received information and transmits the generated operation signal to the shovel 100. The operation content detection device 29A may be configured to generate an operation signal. In such a case, the operation content detection device 29A may output the operation signal to the communication device T2 without passing through the remote controller 40.

The display device D1 is configured to display information on the situation around the shovel 100 based on the image captured by the imaging device C1. In this embodiment, the display device D1 is a multi-display including nine monitors arranged in three rows and three columns, and is configured to be able to display the state in front of, on the left of, and on the right of the shovel 100. Each monitor is a liquid crystal monitor, an organic EL monitor, or the like. However, the display device D1 may be configured by one or more of curved surface monitors, or may be configured by a projector.

The display device D1 may be a display device that can be worn by the operator OP. For example, the display device D1 may be a head-mounted display and may be configured to be able to transmit and receive information to and from the remote controller 40 by wireless communication. The head-mounted display may be connected to the remote controller 40 by a wire. The head mounted display may be a transmissive head mounted display or a non-transmissive head mounted display. The head mounted display may be a monocular head mounted display or a binocular head mounted display.

The display device D1 is configured to display an image that allows the operator OP in the remote control room RC to visually recognize the surroundings of the shovel 100. That is, the display device D1 displays an image so that the operator can check the situation around the shovel 100 as if the operator is in the cabin 10 of the shovel 100 although the operator is in the remote control room RC.

Figure 13:
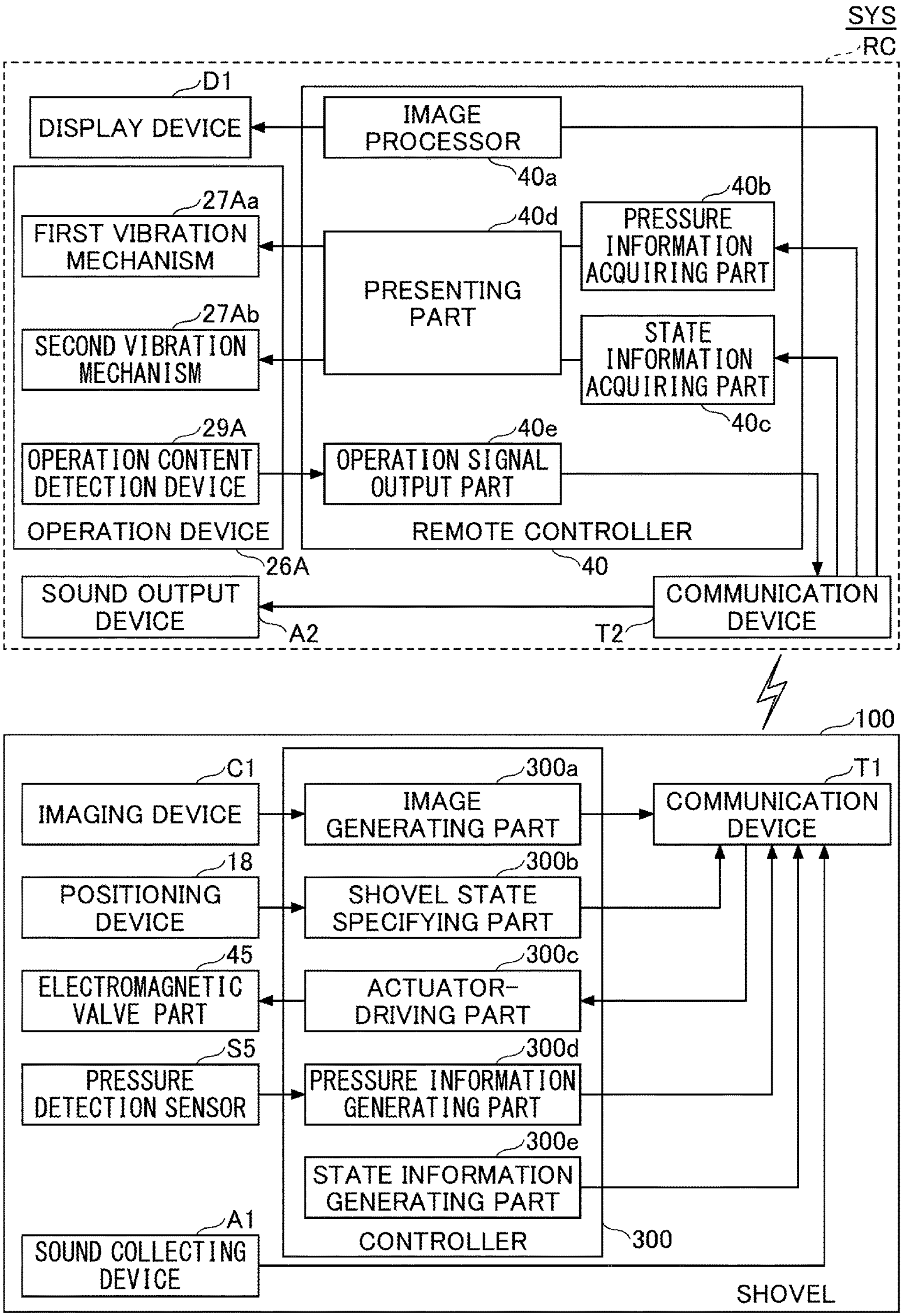
FIG. 13 is a functional block diagram illustrating a configuration example of a construction support system according to the embodiment.

Next, a configuration example of a construction support system SYS of the shovel 100 will be described with reference to FIG. 13. FIG. 13 is a functional block diagram illustrating a configuration example of the construction support system SYS.

In the example illustrated in FIG. 13, the construction support system SYS is configured by the shovel 100 and a remote control room RC related to the shovel 100.

The shovel 100 includes the positioning device 18, the controller 300, the electromagnetic valve part 45, the sound collecting device A1, the imaging device C1, a pressure detection sensor S5, and the communication device T1.

The pressure detection sensor S5 detects the pilot pressures increased or decreased in the respective electromagnetic valves included in the electromagnetic valve part 45 and outputs the detection results to the controller 300 in order to operate the control valves 171 to 176.

The pilot pressure is a pressure increased or decreased in accordance with an operation by the operator. Therefore, by causing the operation device 26A in the remote control room RC to generate a pseudo reaction force corresponding to the detection result, the load being generated in the hydraulic drive system of the shovel 100 can be notified to the operator.

<Functional Blocks of Controller of Shovel>

The controller 300 mounted on the shovel 100 has a function of controlling the shovel 100, similarly to the controller 30 of the above-described embodiment, and a function of performing remote control. The functions of the controller 300 for remote control will be described. The controller 300 achieves a functional configuration for performing remote control of the shovel 100 by, for example, the CPU (not illustrated) reading the program stored in the nonvolatile storage medium.

For example, as illustrated in FIG. 13, the controller 300 includes an image generating part 300*a*, a shovel state specifying part 300*b*, an actuator-driving part 300*c*, a pressure information generating part 300*d*, and a state information generating part 300*e* as functional blocks.

The image generating part 300*a* is configured to generate a surrounding image including an image displayed on the display device D1. The surrounding image is an image used for display on the display device D1. Typically, the surrounding image is an image representing the state of the surroundings of the shovel 100 that the operator could see if the operator were present in the cabin 10. In this embodiment, the surrounding image is generated based on an image captured by the imaging device C1. Specifically, the image generating part 300*a* generates a virtual viewpoint image as a surrounding image based on the images captured by the rear camera C1B, the front camera C1F, the left camera C1L, and the right camera C1R. The image generating part 300*a* may also generate a virtual viewpoint image as a surrounding image based on an image captured by at least one of the rear camera C1B, the front camera C1F, the left camera C1L, and the right camera C1R. A virtual viewpoint of the virtual viewpoint image is an operator's virtual viewpoint corresponding to the position of the eyes of the operator when the operator is seated on the driver's seat in the cabin 10. The operator's virtual viewpoint may be outside the cabin 10.

In this embodiment, coordinates of the operator's virtual viewpoint are derived based on the operator's viewpoint which is the position of the eyes of the operator OP when the operator OP sits on the driver's seat DS in the remote control room RC. The coordinates of the operator's viewpoint may be a fixed value set in advance.

The shovel state specifying part 300*b* is configured to specify the state of the shovel 100. In this embodiment, the state of the shovel 100 includes the position and orientation of the shovel 100. The shovel state specifying part 300*b* specifies the position and orientation of the shovel based on the output of the positioning device 18.

The actuator-driving part 300*c* is configured to drive the actuators mounted on the shovel 100. In this embodiment, the actuator-driving part 300*c* generates and outputs an actuation signal for each of the electromagnetic valves included in the electromagnetic valve part 45 based on the operation signal transmitted from the remote controller 40.

Each electromagnetic valve that has received the actuation signal increases or decreases the pilot pressure acting on the pilot port of the corresponding control valve 171 to 176 in the control valve part 17. As a result, the hydraulic actuator corresponding to each control valve operates at a speed corresponding to the stroke amount of the control valve.

The pressure information generating part 300*d* calculates pilot pressures (an example of loads) being generated by operations corresponding to respective moving directions of the operation lever of the operation device 26A when the operation device is a hydraulic pilot type, based on detection results of pilot pressures increased or decreased in the respective electromagnetic valves of the electromagnetic valve part 45 detected by the pressure detection sensor S5, generates pressure information (an example of load information) indicating the pilot pressures corresponding to the respective moving directions of the lever of the operation device 26A, and outputs the information to the communication device T1.

The state information generating part 300*e* generates state information indicating the state of the shovel 100 to be transmitted to the operator in the remote control room RC based on the detection results of various sensors provided in the shovel 100. The state information may include, for example, information indicating that the shovel 100 is tilted by equal to or more than a predetermined threshold value.

<Remote Control Room>

The remote control room RC includes the operation device 26A, the operation content detection device 29A, the remote controller 40, the sound output device A2, the indoor imaging device C2, the display device D1, and a communication device T2.

The functions of the remote controller 40 installed in the remote control room RC will be described. The remote controller 40 controls each component in the remote control room RC by, for example, the CPU (not illustrated) reading the program stored in the nonvolatile storage medium.

<Functional Blocks of Remote Controller>

The remote controller 40 includes, as functional blocks, an image processor 40*a*, a pressure information acquiring part 40*b*, a state information acquiring part 40*c*, a presenting part 40*d*, and an operation signal output part 40*e*.

The image processor 40*a* composes the surrounding image of the shovel 100 transmitted from the shovel 100 and the image for guiding the operator, and outputs a composed image to the display device D1.

The operation signal output part 40*e* is configured to generate an operation signal. In this embodiment, the operation signal output part 40*e* generates and outputs an operation signal based on the output of the operation content detection device 29A.

The operation signal output by the operation signal output part 40*e* is transmitted to the shovel 100 by the communication device T2 via the wireless communication network. Thus, the hydraulic drive system of the shovel 100 is caused to operate. Then, in accordance with the operation, the pressure information generated by the pressure information generating part 300*d* of the shovel 100 is transmitted to the remote control room RC.

The pressure information acquiring part 40*b* (an example of a load information acquiring part) acquires, from the shovel 100 via the communication device T2, pressure information indicating the pilot pressure (an example of a load) being generated by an operation corresponding to a direction in which input has been made through the operation device 26A. The pressure information acquiring part 40*b* extracts pilot pressures corresponding to the front-rear direction and the left-right direction for the lever 260A of the operation device 26A based on the acquired pressure information, and outputs the pilot pressures for the respective directions to the presenting part 40*d*.

The state information acquiring part 40*c* acquires state information indicating the state of the shovel 100 from the shovel 100 via the communication device T2. The state information acquiring part 40*c* outputs the acquired state information to the presenting part 40*d*.

The presenting part 40*d* generates a vibration signal for vibrating each of the first vibration mechanism 27Aa and the second vibration mechanism 27Ab based on the pilot pressure for each direction and the state information, and outputs the vibration signal to each of the first vibration mechanism 27Aa and the second vibration mechanism 27Ab.

In a case where input is made in at least one direction among directions in which input can be made through the lever 260A of the operation device 26A, the presenting part 40*d* according to this embodiment generates a vibration signal indicating vibration for generating a pseudo force representing a reaction force corresponding to each of at least one direction in which input has been made.

For example, as illustrated in FIG. 8, when the lever 260A is tilted in the right direction 7001 for excavation by the bucket 6 in a case where the left-right direction of the lever 260A corresponds to excavation and release of the bucket 6, the presenting part 40*d* generates a vibration signal for generating a pseudo force that makes the operator feel to be pulled in the left direction 7002 as a reaction force corresponding to the pilot pressure related to the control valve 174 for causing the bucket 6 to operate, and outputs the vibration signal to the second vibration mechanism 27Ab of the lever 260A. Thus, the operator can recognize the load that has been generated in the bucket 6.

The presenting part 40*d* changes the amplitudes (the degrees of vibration) of the sawtooth waves generated at a ratio of 3:1 in accordance with the magnitude of the pilot pressure related to the control valve 174 that causes the bucket 6 to operate. Thus, the operator can recognize the magnitude of the load being generated in the bucket 6. Accordingly, the operator can perform an operation in consideration of the magnitude of the load, and thus safety can be improved.

Note that, the reaction force by the pseudo force generated in this embodiment is not limited to the load of the bucket 6, and may be a load as long as the load is generated by the operation of the shovel 100, corresponding to the direction operated by the operation device 26. For example, the load may be a load being generated in the arm 5, a load generated by right swing or left swing of the upper swing body 3, or a load being generated in the boom 4.

The presenting part 40*d* may superimpose the vibration based on the state information acquired by the state information acquiring part 40*c* on the vibration that generates a pseudo force.

The vibration based on the state information acquired by the state information acquiring part 40*c* repeats, for example, a waveform of a pattern in which positive amplitudes and negative amplitudes alternately occur in a predetermined cycle.

The state information for causing the vibration includes information indicating that the shovel 100 is tilted by equal to or more than a predetermined threshold value. That is, the presenting part 40*d* generates vibration based on the state information in a case where the state information acquired by the state information acquiring part 40*c* includes information indicating that the shovel 100 is tilted by equal to or more than a predetermined threshold value. Note that this embodiment illustrates an example of the state information, and the state information is not limited to the state information indicating that the shovel 100 is tilted by equal to or more than a predetermined threshold value. That is, the state information is information as long as information includes information indicating the current situation of the shovel

100. The presenting part 40*d* generates a vibration signal for generating vibration for transmitting the current state information of the shovel 100 to the operator.

In a case where the vibration based on the state information acquired by the state information acquiring part 40*c* and the vibration that generates a pseudo force are presented at the same time, the presenting part 40*d* may vary the ratio of the amplitudes of the vibrations to be superimposed according to a predetermined condition. For example, the ratio of the amplitudes to be superimposed may be changed according to the tilt angle of the lever 260A.

In this embodiment, an example has been described in which the presenting part 40*d* superimposes the vibration based on the state information acquired by the state information acquiring part 40*c* on the vibration that generates the pseudo force. However, in this embodiment, the vibration based on the state information is not limited to the example of being superimposed on the vibration that generates the pseudo force, and the presenting part 40*d* may indicate only the vibration based on the state information acquired by the state information acquiring part 40*c*. In such a way, the presenting part 40*d* according to this embodiment may switch the vibration to be presented from the vibration that generates the pseudo force, the vibration based on the state information, and a combination of the vibration that generates the pseudo force and the vibration based on the state information, as necessary. The presentation of the vibration is not limited to a case of performing remote operation, and may be performed on the operation device 26 in a case where the operation is performed in the cabin 10 of the shovel 100.

Accordingly, since the vibration based on the state information acquired by the state information acquiring part 40*c* and the vibration that generates the pseudo force are presented to the operator at the same time, the operator can recognize pieces of information (for example, the load being generated in the shovel 100 by an operation corresponding to the operation input, and the shovel 100 being tilted by equal or more than a threshold value). Thus, by recognizing the pieces of information, the operator can perform an operation corresponding to the recognition. This can improve safety.

With the configuration described above, the construction support system SYS enables the operator OP in the remote control room RC to remotely control the shovel 100 at a remote location. At such a time, the construction support system SYS enables the operator OP to visually recognize, in real time, a surrounding image generated based on an image captured by the imaging device C1 attached to the shovel 100. Specifically, the construction support system SYS can display a part of the surrounding image generated mainly based on the image captured by the imaging device C1 on the multi-display as the display device D1.

The construction support system SYS causes the operation device 26A to generate vibration for generating the pseudo force indicating the reaction force corresponding to the operation performed in the shovel 100. Thus, the operator can recognize the load corresponding to the operation performed in the shovel 100.

In this embodiment, since the operation signal corresponding to the direction in which input has been made through the operation device 26A is transmitted to the shovel 100 via the wireless communication network, the remote operation of the shovel 100 from the remote control room RC can be achieved. By presenting the pseudo force in the direction corresponding to the direction in which input was made at the time of remote control, it becomes easy to make the operator recognize the current situation at the time of remote control. Therefore, improvement in safety can be achieved.

In this embodiment, by causing the operation device 26 to generate vibration for generating a pseudo force, it is possible to recognize the load being generated in the shovel 100 and to provide various information of the shovel 100 operated by the vibration. For example, as information that can be provided, in a case where there is a possibility that the operation may affect the shovel 100 or the surrounding environment, it may be difficult for the operator to intuitively perceive the surrounding situation by sight at the time of remote operation. Therefore, in this embodiment, vibration can be applied to alert the operator. This can improve safety.

<Effect>

In the above-described embodiments and modified examples, a force or a pseudo force in a direction corresponding to the direction in which input has been made can be presented to the operator operating the shovel 100. That is, since the direction can be presented to the operator to correspond to the direction in which input has been made, the state of the shovel 100 can be notified to the operator in more detail. Thus, the operator can perform an operation according to the current situation of the shovel 100, and thus safety can be improved.

In the above-described embodiments, the example in which the present disclosure is applied to the shovel as the construction machine has been described. However, the construction machine is not limited to the shovel, and may be any construction machine that can be operated by an operator.

Although the embodiments in which the shovel is used as an example of the construction machine have been described above, the present disclosure is not limited to the above-described embodiments and the like. Various changes, modifications, substitutions, additions, deletions, and combinations are possible within the scope of the claims. Such modifications are also included in the technical scope of the present disclosure.

What is claimed is:

1. An operation unit for a construction machine, comprising:

an operation part configured to be operated to input a direction for operating the construction machine, the operation part including a movable part having both a steering member configured to be touched by the operator and a convex spherical member;

a support part configured to support the convex spherical member of the movable part such that the convex spherical member is rotatable around two axes orthogonal to each other; and a driving part configured to rotate the convex spherical member of the movable part individually around each of the two axes, wherein, when a first direction is input through the operation part, the operation part is configured to present a second direction corresponding to the first direction to an operator operating the operation part by causing the driving part to rotate the convex spherical member, the steering member includes a pressing member configured to be pressed, the movable part has a cylindrical hollow portion for passing a signal line connected to the pressing member, and the support part has a shape that does not cover an opening that is one end of the hollow portion.

2. The operation unit for a construction machine as claimed in claim 1, further comprising:

a setting part configured to set operation procedure information indicating an operation procedure including a third direction input through the operation part in order for the construction machine to perform a predetermined operation, wherein the operation part is configured to, when the first direction is input through the operation part, present the second direction to the operator in a case where the input first direction is different from the third direction indicated as a current operation procedure in the operation procedure information.

3. A construction machine comprising:

a lower traveling body;

an upper swing body swingably mounted on the lower traveling body;

an attachment attached to the upper swing body; and the operation unit as set forth in claim 1.

4. An operation unit for a construction machine, comprising:

an operation part configured to be operated to input a direction for operating the construction machine; and a vibration mechanism configured to vibrate the operation part, wherein the operation part is configured to, when a first direction is input through the operation part, vibrate the vibration mechanism with a waveform asymmetric in an amplitude direction with respect to a reference value in order to generate a pseudo force for presenting a second direction corresponding to the first direction, and present the second direction to an operator operating the operation part.

5. The operation unit for a construction machine as claimed in claim 4, wherein the vibration mechanism includes a plurality of vibration mechanisms for respective directions that the operation part is configured to input, the respective directions being respective directions for operating the construction machine, and the operation part is configured to, when the first direction is input among the respective directions that the operation part is configured to input, vibrate one of the vibration mechanisms to generate the pseudo force presenting the second direction.

6. The operation unit for a construction machine as claimed in claim 4, further comprising:

a load information acquiring part configured to acquire load information indicating a load being generated in the construction machine, wherein the operation part is configured to change a degree of vibration of the vibration mechanism based on the load information acquired by the load information acquiring part.

7. The operation unit for a construction machine as claimed in claim 4, further comprising:

a state information acquiring part configured to acquire state information indicating a state of the construction machine, wherein the operation part is configured to superimpose vibration based on the state information acquired by the state information acquiring part on vibration generated by the vibration mechanism when the first direction is input.

8. The operation unit for a construction machine as claimed in claim 4, further comprising:

a setting part configured to set operation procedure information indicating an operation procedure including a third direction input through the operation part in order for the construction machine to perform a predetermined operation, wherein the operation part is configured to, when the first direction is input through the operation part, present the second direction to the operator in a case where the input first direction is different from the third direction indicated as a current operation procedure in the operation procedure information.

9. A construction machine comprising:

a lower traveling body;

an upper swing body swingably mounted on the lower traveling body;

an attachment attached to the upper swing body; and the operation unit as set forth in claim 4.

10. An operation unit for a construction machine, comprising:

an operation part configured to be operated to input a direction for operating the construction machine, wherein the operation part is configured to, when a first direction is input through the operation part, present a second direction corresponding to the first direction to an operator operating the operation part, and an operation signal corresponding to the first direction input through the operation part is transmitted to the construction machine via a wireless communication network.

11. The operation unit for a construction machine as claimed in claim 10, further comprising:

a setting part configured to set operation procedure information indicating an operation procedure including a third direction input through the operation part in order for the construction machine to perform a predetermined operation, wherein the operation part is configured to, when the first direction is input through the operation part, present the second direction to the operator in a case where the input first direction is different from the third direction indicated as a current operation procedure in the operation procedure information.

12. A construction machine comprising:

a lower traveling body;

an upper swing body swingably mounted on the lower traveling body;

an attachment attached to the upper swing body; and the operation unit as set forth in claim 10.

* * * * *